US012675104B1

(12) United States Patent      (10) Patent No.:    US 12,675,104 B1

Jones et al.      (45) Date of Patent:     Jul. 7, 2026

(54) METHOD AND APPARATUS FOR BREAKING GAS LOCK IN AN ELECTRICAL SUBMERSIBLE PUMP

(71) Applicant: Valiant Artificial Lift Solutions, Oklahoma City, OK (US)

(72) Inventors: Jay S. Jones, Oklahoma City, OK (US); Michael Richard Stegall, Midland, TX (US)

(73) Assignee: VALIANT ARTIFICIAL LIFT SOLUTIONS, LLC, Oklahoma City, OK (US)

( * ) Notice: Subject to any disclaimer, the term of this patent is extended or adjusted under 35 U.S.C. 154(b) by 340 days.

(21) Appl. No.: 18/369,429

(22) Filed: Sep. 18, 2023

(51) Int. Cl.
    *G05B 23/02*      (2006.01)
    *H02P 23/14*      (2006.01)

(52) U.S. Cl.
    CPC .......... *G05B 23/0289* (2013.01); *H02P 23/14* (2013.01); *G05B 2223/02* (2018.08)

(58) Field of Classification Search
    CPC ...... E21B 43/128; E21B 47/008; F04B 47/06; F04B 49/065; F04B 49/10; F04B 49/103; F04D 15/0066; F04D 15/0088; F04D 15/02; F04D 15/0245; F04D 15/0254; F04D 9/001; F04D 9/002; F04D 9/003; F04D 13/086; F04D 13/10; G05B 15/02; G05B 23/0289; G05B 2223/02; H02H 7/0827; H02P 23/14; H02P 29/00

See application file for complete search history.

(56) References Cited

U.S. PATENT DOCUMENTS

| | | | |
|---|---|---|---|
| 6,167,965 | B1 | 1/2001 | Bearden et al. |
| 7,798,215 | B2 | 9/2010 | Leuthen et al. |
| 8,684,078 | B2 | 4/2014 | Boyles et al. |
| 8,727,737 | B2 | 5/2014 | Seitter |
| 9,057,256 | B2 | 6/2015 | Ige et al. |
| 9,097,247 | B1 * | 8/2015 | Cushing ............... F04B 49/065 |
| 9,261,097 | B2 | 2/2016 | Moricca et al. |
| 10,197,060 | B2 | 2/2019 | Dowling |

(Continued)

FOREIGN PATENT DOCUMENTS

| | | |
|---|---|---|
| AU | 2019236622 B1 | 11/2019 |
| CN | 91200001 | 4/1992 |

(Continued)

*Primary Examiner* — Loren C Edwards

(74) *Attorney, Agent, or Firm* — James F. Lea, III; Gable Gotwals

(57)         ABSTRACT

A software implemented method that facilities operational processes through control of a variable speed drive (VSD) that electrically drives a motor of an Electrical Submersible Pump (ESP). The control system utilizes a human interface displaying drive and pump parameters that permits adjustments. Detection of a drop in motor amps indicates gas lock wherein pump stages nearest the intake are affected by gas entering the pump. Motor speed is increased for increasing head generated by stages unaffected by gas. The motor speed increase generates total head in excess of pump depth. Feet of head generated may be calculated for each of stage of the pump at a given motor speed. The feet of head per stage is multiplied by a number of stages to determine total head generated. The total head generated is compared to the pump depth, and motor speed is increased until the total head exceeds pump depth.

7 Claims, 20 Drawing Sheets

(56)     References Cited

U.S. PATENT DOCUMENTS

| | | | |
|---|---|---|---|
| 10,323,647 B2 | 6/2019 | Grzeika | |
| 10,364,655 B2 | 7/2019 | Patel et al. | |
| 10,605,054 B2 | 3/2020 | Klenner et al. | |
| 10,830,024 B2 | 11/2020 | Collins et al. | |
| 10,903,778 B2 | 1/2021 | Nojima | |
| 11,401,938 B2 | 8/2022 | Chavis et al. | |
| 11,480,039 B2 | 10/2022 | Beck et al. | |
| 2009/0044938 A1 | 2/2009 | Crossley et al. | |
| 2012/0027630 A1* | 2/2012 | Forsberg | E21B 47/008 |
| | | | 73/24.06 |
| 2013/0175030 A1* | 7/2013 | Ige | G05B 15/02 |
| | | | 700/282 |
| 2015/0308244 A1 | 10/2015 | Cardamone et al. | |
| 2018/0274345 A1 | 9/2018 | Haapanen | |
| 2021/0071509 A1 | 3/2021 | Beck et al. | |

FOREIGN PATENT DOCUMENTS

| | | | |
|---|---|---|---|
| CN | 1029753 C | 9/1995 | |
| CN | 115263772 A | 11/2022 | |
| DE | 2934076 A1 | 3/1908 | |
| WO | WO2021155272 A1 | 8/2021 | |

* cited by examiner

METHOD AND APPARATUS FOR BREAKING GAS LOCK IN AN ELECTRICAL SUBMERSIBLE PUMP

FIELD OF THE INVENTION

The present invention relates, generally, to a software implemented method that facilities operational processes through control of a variable speed drive (VSD) that electrically drives a motor of an Electrical Submersible Pump (ESP). More particularly, the invention relates to detection of a gas lock condition in an electrical submersible pump assembly and methods for breaking the gas lock condition.

BACKGROUND OF THE INVENTION

A gas lock condition occur when gas enters a pump of an ESP in a quantity sufficient to prevent the ESP from continuing to pump fluid to the surface. Since gas is compressible, the gas diminishes the pumping capacity of pump stages that are exposed to the gas, resulting in a reduction of fluid movement and potential overheating and failure of an ESP motor.

One way to detect gas lock is to monitor motor current to determine when the motor current falls below a set threshold. Standard practice is to stop the pump. The pump is typically not restarted until fluid in production tubing has displaced gas in the pump.

SUMMARY OF THE INVENTION

The invention relates to a software implemented method that facilities unique operational processes through control of a Variable Speed Drive (VSD), that electrically drives the motor of an Electrical Submersible Pump (ESP). The control system of the invention utilizes a human interface, e.g., a touch screen, for permitting display of variable speed drive parameters and pump conditions and allows for adjustment of the parameters.

In one aspect, the invention includes providing a plurality of selectable processes or applications, each tailored for a particular well condition. If no application is selected, the speed control may be constant and may be determined by operator entry of a specific speed setpoint, e.g., in units of Hertz.

Selectable processes are provided for regulating a speed setting of the variable speed drive based on various different feedback parameters, which in turn, regulate the pumping volume, e.g., the control system may facilitate current/speed control, pressure control and analog follower control.

Current/Speed Control utilizes current setpoint for the motor, e.g., entered in Amps. The control system controls the frequency setting of the variable speed drive as necessary to maintain a desired current setpoint. Current/Speed control utilizes parameters that may be entered by an operator, e.g., motor current setpoint, speed adjust cutoff, adjust small limit, adjust large limit, speed adjust deadband, control loop period, invert output (to increase or decrease control variable), pressure sensor, current/speed control (enable/disable), and drive output amps.

Pressure Control utilizes a pressure setpoint that is entered by an operator. The control system adjusts the frequency of the drive as required to maintain a desired pressure setpoint. Pressure control utilizes parameters that may be entered by an operator such as pressure setpoint, speed adjust cutoff, adjust small limit, adjust large limit, speed adjust deadband, control loop period, invert output (to increase or decrease control variable), pressure sensor, pressure control (enable/disable), and pressure input.

Analog Follower Control provides a means of controlling a frequency setting of the variable speed drive based on an analog input signal. Analog follower control utilizes parameters that may be set by an operator such as PLC Analog Inputs/Yaskawa Analog Inputs, analog controller, drive output amps, motor rotation, analog follower control (enable/disable), analog follower invert (increase or decrease the control variable).

Selectable processes are provided for specific situations when the pumps are seized or when the conditions require action other than continuous pumping, e.g., pump stuck control and timed pump control.

Pump Stuck Control provides a means for breaking loose stuck pumps. Pump Stuck control utilizes parameters such as cycle time, cycle attempts, motor direction, drive output amps, motor rotation, attempts remaining, pump stuck control (enable/disable).

Timed Pump Control provides a means of setting a period during which the drive will run and for setting a period during which the drive will be stopped. Timed pump control utilizes parameters such as run time, top time, timed pump control (enable/disable)

Gas locking of pumps occurs when a large volume of gas enters the pumps causing the pumps to no longer move fluid. The control system of the invention senses when this occurs by sensing a decrease in load current. If the gas lock recovery process is enabled by the user, the control system will take steps to clear a gas lock condition.

In addition to enabling the selection of one of the above listed processes, a human machine interface also facilitates selection and display of limit setpoints for operation of the control system for assessing fault annunciation and shutdown when limits are exceeded. In one embodiment, the control system may be set to automatically restart the ESP system once the parameters are within limit set points and after a restart delay period.

In one embodiment, the human machine interface is mounted on a front panel of a variable speed drive enclosure. The control system communicates with the variable speed drive. The human machine interface preferably provides an operator with menu driven screens for displaying parameter values and for setup of process parameters. Parameter values are provided by external devices that provide signal inputs to the human machine interface for display. The external devices include motor temperature sensor, intake temperature sensor, heatsink temperature sensor, pump intake pressure, motor volts.

In one aspect, the control system is a variable speed drive interface designed to provide specialized functionality and process control for an ESP application that not provided by the variable speed drive alone. The human machine interface of the control system facilitates easy adjustment of all required variable speed drive parameters and permits access to important information and data required in an ESP application.

In a preferred embodiment, the control system of the invention includes features for implementing I/O capabilities including digital inputs, digital outputs, milliamp analog inputs, voltage analog outputs, user ports including USB, which may be used for download of data log, Micro SDHC card slot used for recording or downloading of data log, RS485 configured for downhole sensor Modbus parameters. Example port settings are 9600 baud, 8 bit, 1 stop bit, no parity, RS232 serial ports, ethernet port RJ45 for user access to the control system for data log download. In one embodiment the port is mounted on variable speed drive enclosure door front below the human machine interface.

The control system of the invention preferably includes a touch-screen human machine interface mounted on the variable speed drive door front, a PLC (Programmable Logic Controller) mounted inside the variable speed drive enclosure, an ethernet switch mounted inside the variable speed drive enclosure that routes ethernet communications among the various control system components, and a micro SDHC memory card that may be inserted into the SDHC slot of the human machine interface, e.g., for data log storage.

In one aspect of the invention, the control system of the invention facilitates a method of operating an electrical submersible pump installation having an electrical submersible pump that includes a motor or drive and a pump having multiple stages. The control system monitors a drive output current load of the drive and determines when the drive output current load is below a current setpoint for establishing an undercurrent condition. A fault routine may be executed that includes changing a drive frequency setting of the variable speed drive to effect a change in the frequency of the drive to a reaction speed parameter for a reaction time period.

After the control system determines that the drive output current load is below a current setpoint, i.e., when the control system established that an undercurrent condition is occurring, the undercurrent condition may be ignored for a period of time equal to a trip delay time and then a fault routine may be initiated. The fault routine may include shutting down the drive and determining whether a number of restart attempts is less than or equal to a number of permissible restart attempts. If so, the control system may automatically execute a restart attempt.

In one condition, the current setpoint is below an operating current setpoint corresponding to a normal operating speed and the reaction speed parameter is a reaction speed that is greater than the normal operating speed. The reaction speed increases head generated by each stage of the multiple stages of the pump that is not affected by gas that has entered the pump. The stages not affected by gas and being driven at the reaction speed generate a total amount of head in excess of a depth of the electrical submersible pump.

In one embodiment, the control system determines a reset delay that reflects an amount of time that there has been no subsequent fault condition after the restart attempt and if the amount of time is greater than a set time, the control system resets the number of permissible restart attempts. Once the drive is started, the undercurrent condition may be ignored for a period of time equal to a bypass time from the step of starting the drive.

The electrical submersible pump installation may be operated to detect a drop in amps of the motor for determining a gas lock condition of the pump wherein a stage or stages of the pump that are nearest to the pump intake are affected by gas. The motor speed may be increased for increasing head generated by each of the multiple stages of the pump that are not affected by gas that may have entered the pump. The motor speed should be increased sufficiently to generate a total amount of head in excess of a depth of the pump.

Additional steps for clearing gas lock condition may include calculating feet of head generated for each of the multiple stages of the pump at a given speed of the motor, multiplying the feet of head per stage by a number of the stages in the pump to determine total head generated, comparing the total bead generated with the depth of the pump, and increasing the speed of the motor until the total head generated exceeds the depth of the pump.

DETAILED DESCRIPTION OF THE PREFERRED EMBODIMENTS

Figure 1:
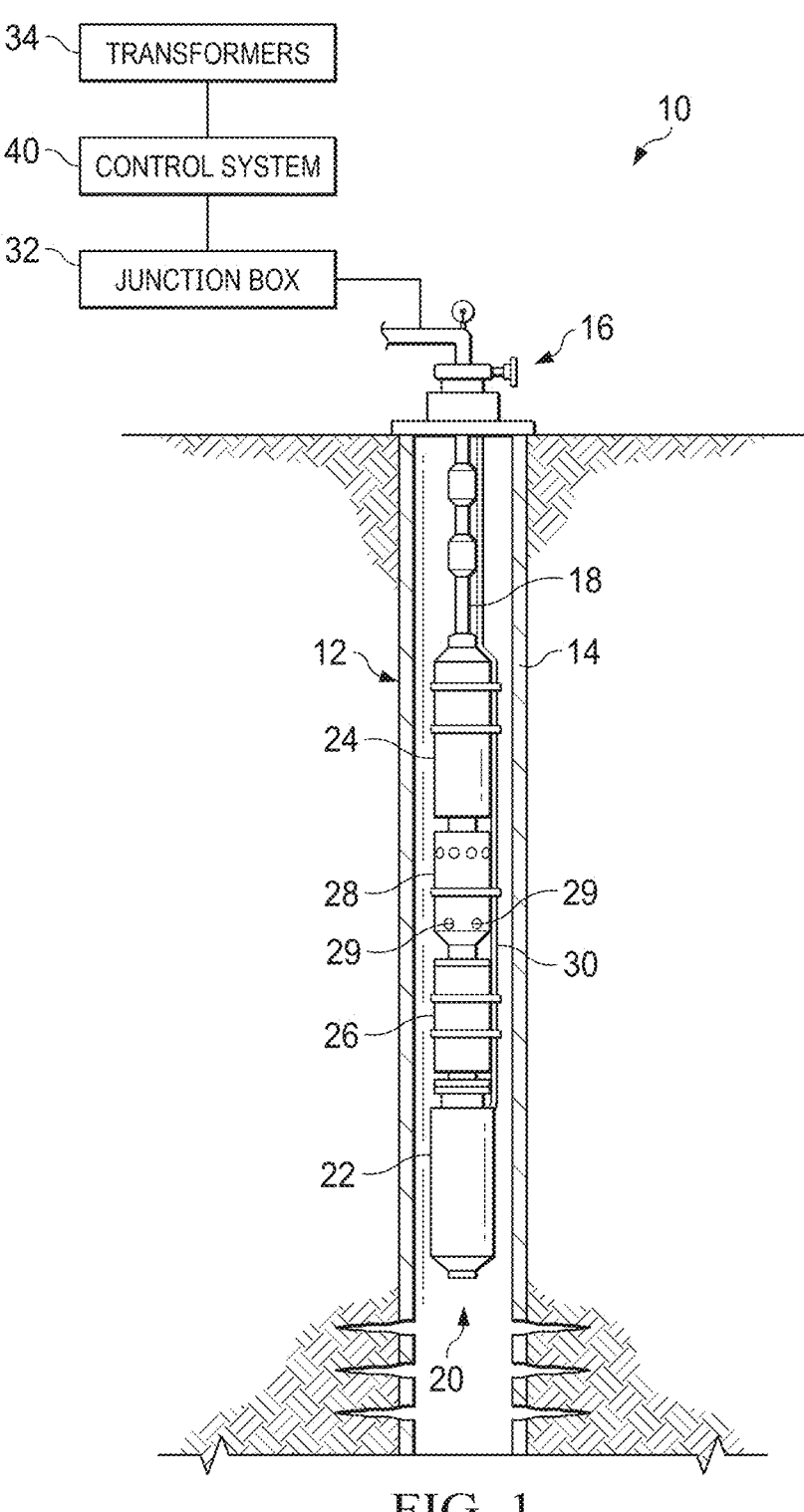
FIG. 1 is a schematic of a typical wellsite deploying an electrical submersible pump.

Referring to FIG. 1, shown is a wellsite, designated generally 10, having wellbore 12 that includes casing 14 that extends into the earth from wellhead 16 at the surface. An electrical submersible pump 20 may be deployed on a tubing string 18.

A typical configuration for electrical submersible pump 20 includes electrical motor 22 that drives centrifugal pump 24. Between electrical motor 22 and centrifugal pump 24 seal section 26 and rotary gas separator 28 may be provided. In the example configuration shown, intakes 29 are provided on rotary gas separator 28.

Flat cable 30 extends a length of electrical submersible pump 20 to provide power to electrical motor 22. Flat cable 30 communicates with junction box 32, variable speed drive controller 42 and, ultimately with transformers 34.

Figure 2:
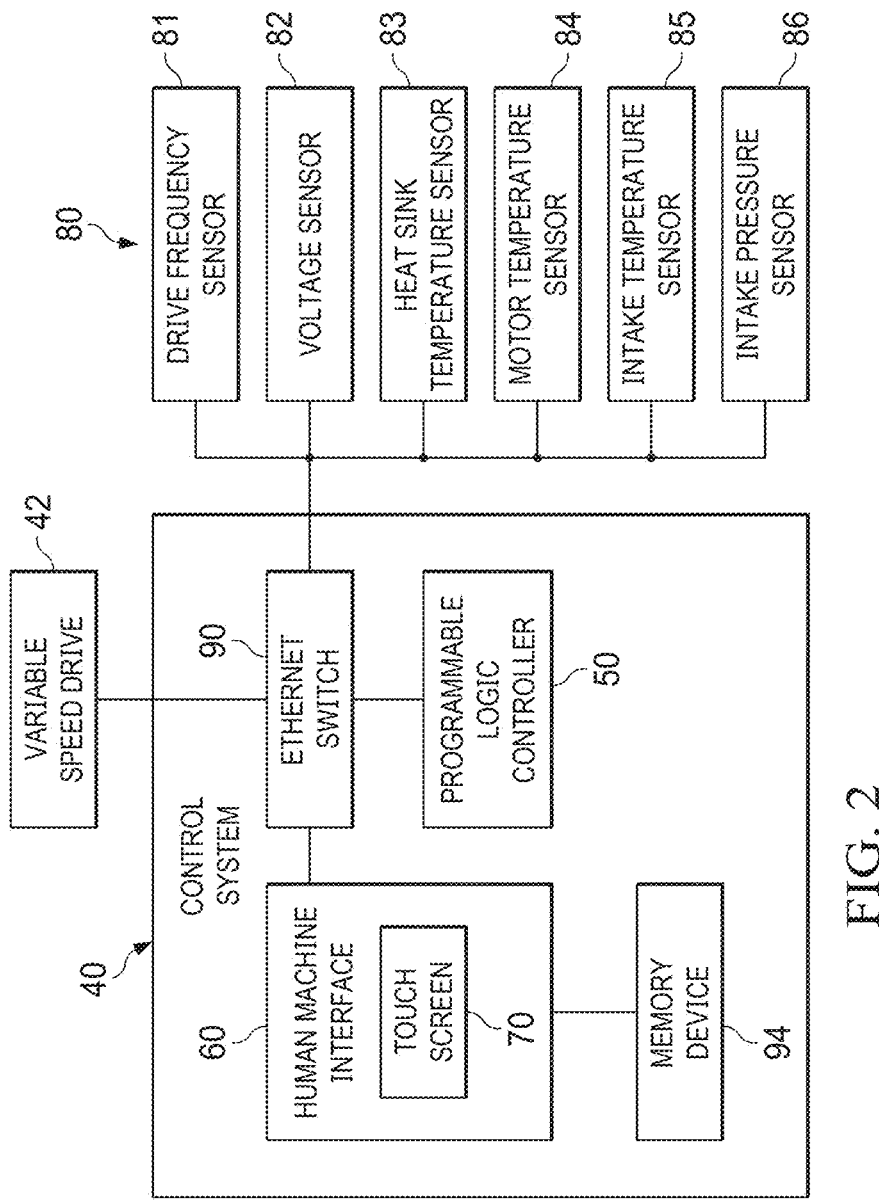
FIG. 2 is a schematic of a variable speed drive components for interacting with the variable speed drive.

Referring now to FIG. 2, in one embodiment, control system 40 interfaces with variable speed drive 42, to control the frequency of operation of electrical motor 22 e.g., via programmable logic controller (PLC) 50. PLC 50 communicates with variable speed drive 42 and with a human interface 60 to facilitate entry and execution of operator parameters and processes. In one embodiment, human interface 60 includes touch screens 70 to facilitate an operator interface.

Various input devices, such as sensors, may be deployed on ESP 20 and communicate with PLC 50. Sensors, designated generally 80, are deployed on ESP 20 and are in communication with PLC 50 for providing data to control system 40. Example sensors include drive frequency sensor 81, voltage sensor 82, heat sink temperature sensor 83, motor temperature sensor 84, intake temperature sensor 85 and intake pressure sensor 86, which are deployed on ESP 20 and on wellsite 10 in a manner known in the art.

In one embodiment, touch screen 70 is capable of presenting different displays that allow an operator to monitor parameters and to input preferences, such as set-up and display of signal inputs from external devices 80 and set-up of fault trip limits and time delays.

In one embodiment, control system 40 interfaces with variable speed drive (VSD) 42. Control system 40 is designed specifically to provide specialized functionality and process control for an electrical submersible pump (ESP) application that is not provided by VSD 42 alone. Control system 40 facilitates easy adjustment of required VSD parameters and provides easy access to important information and data required for operating ESP 20.

In a preferred embodiment, control system 40 features the following I/O capabilities that includes deployment of digital inputs, digital outputs, milliamp analog inputs, voltage analog outputs. Control system 40 preferably provides user ports, such as USB ports that may be used for downloading of data log, Micro SDHC card slot for recording or downloading of data log, RS485 configured for downhole sensor Modbus parameters (Port settings: 9600 baud, 8 bit, 1 stop bit, no parity), RS232 serial ports, Ethernet Port RJ45 for user access to control system 40 for data log download. The ethernet port is mounted on the VSD enclosure door front below the human machine interface.

Human machine interface 60 is preferably provided in the form of touch screen 70, although other interfaces are contemplated, including keyboards, Bluetooth®, or other protocols that facilitate wireless connectivity and plugin devices. Touch screen 70 may be mounted on a door front of variable speed drive controller 42. Programmable logic controller (PLC) 50 communicates with variable speed drive controller 42. Ethernet Switch 90 communicates with control system 40. Ethernet switch 90 routes the ethernet communications among the components of control system 40.

Portable memory storage device 94, such as a Micro SDHC memory card, may be inserted into an SDHC slot of human interface 60. Memory device 94 may be used for data log storage.

Figure 3:
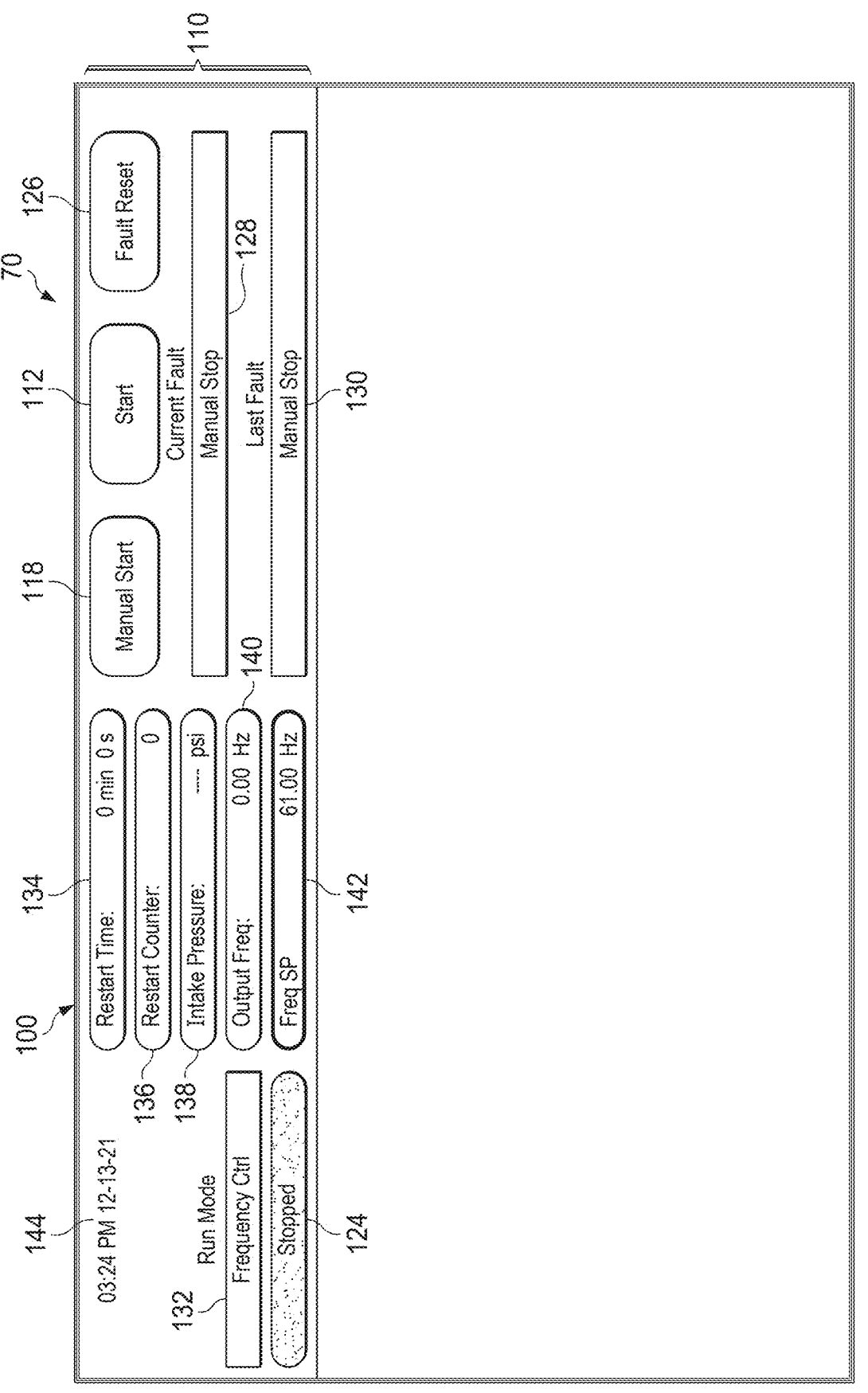
FIG. 3 is a banner screen displayed by the human machine interface of the invention.

Referring now to FIG. 3, in one embodiment, touch screen 70 displays banner screen 100 upon power up of the system. Banner screen 100 includes banner display 110 that comprises a portion, e.g., a top ¼ of touch screen 70. Banner display 110 is preferably duplicated for every screen display on touch screen 70 so that contents of banner display 110 are always available. As can be seen in FIG. 3, banner display 110 includes a plurality of buttons and indicators.

Still referring to FIG. 3, start/stop button 112 allows for three possible conditions, of control system 40, i.e., start/stop button 112 is used to start implementation of variable speed drive 42 to control motor 22 when in manual start mode, selected via manual start/auto start button 114, or to begin countdown time to start implementation of the variable speed drive 42 when in auto start mode.

Start/stop button 112 may be used to stop motor 22 via variable speed drive controller 40. In one embodiment, start/stop button 112 is displayed as a start button that is used to start motor 22 via variable speed drive 42 when in control system 40 is in a manual start mode or to begin countdown time to start when control system 40 is in auto start mode. A second condition for start/stop button 112 is when a, "stop button" is presented. Activation of start/stop button 112 when, "stop button" is presented stops motor 22 via variable speed drive 42. A third condition of start/stop button 112 is, "E-Stop Actuated display". The "E-Stop Actuated display" indicates when e-stop is actuated, and that the start condition is not available.

Manual start/auto start button 118 enables manually starting motor 22 via variable speed drive 42 and disables any automatic restarting after faults. When manual start/auto start button 118 displays "manual start", control system 40 is in manual start mode. When manual start/auto start button 118 displays, "auto start", control system 40 is in auto start mode. In auto start mode, button 118 enables starting of motor 22 after a time-out set by a global restart time and enables automatic restarting of motor 22 after a fault. Running/stopped indicator 124 indicates the run status of variable speed drive 42.

Fault reset button 126 enables the clearing of a current fault. Current fault indicator 128 indicates an existing fault. If a current fault exists, the fault will need to be cleared to start motor 22 via variable speed drive 42. Last fault indicator 130 indicates a description of the previous fault condition that has been cleared from current fault indicator 128.

Run mode indicator field 132 indicates one of six possible modes that may be selected. Possible modes are provided to an operator for selection on applications page 700, discussed below. As discussed in relation to applications page 700, run mode indicator field 132 displays, "frequency control mode" as the default run mode. Frequency control mode enables a desired speed to be manually entered for motor 22 to be implemented by variable speed drive 40. Five other modes are addressed in the discussion of applications page 700, below.

Restart time indicator field 134 indicates countdown time during an auto-start or restart attempt. Restart counter indicator field 136 indicates a number of restart attempts remaining for an active restart condition.

Intake pressure indicator field 138 indicates intake pressure at intake 29 of electrical submersible pump 20, e.g., via intake pressure sensor 86. Output Freq indicator 140 indicates a current actual output frequency of variable speed drive 42 in Hertz.

Freq SP field 142 actuates a pop-up keypad for entry of a desired frequency setpoint of motor 22 via variable speed drive 42. Frequency data may be provided by drive frequency sensor 81. Minimum and maximum limits are indicated below the pop-up keypad and are determined by min and max frequency settings entered on the quick start page 600, discussed below.

Figure 4:
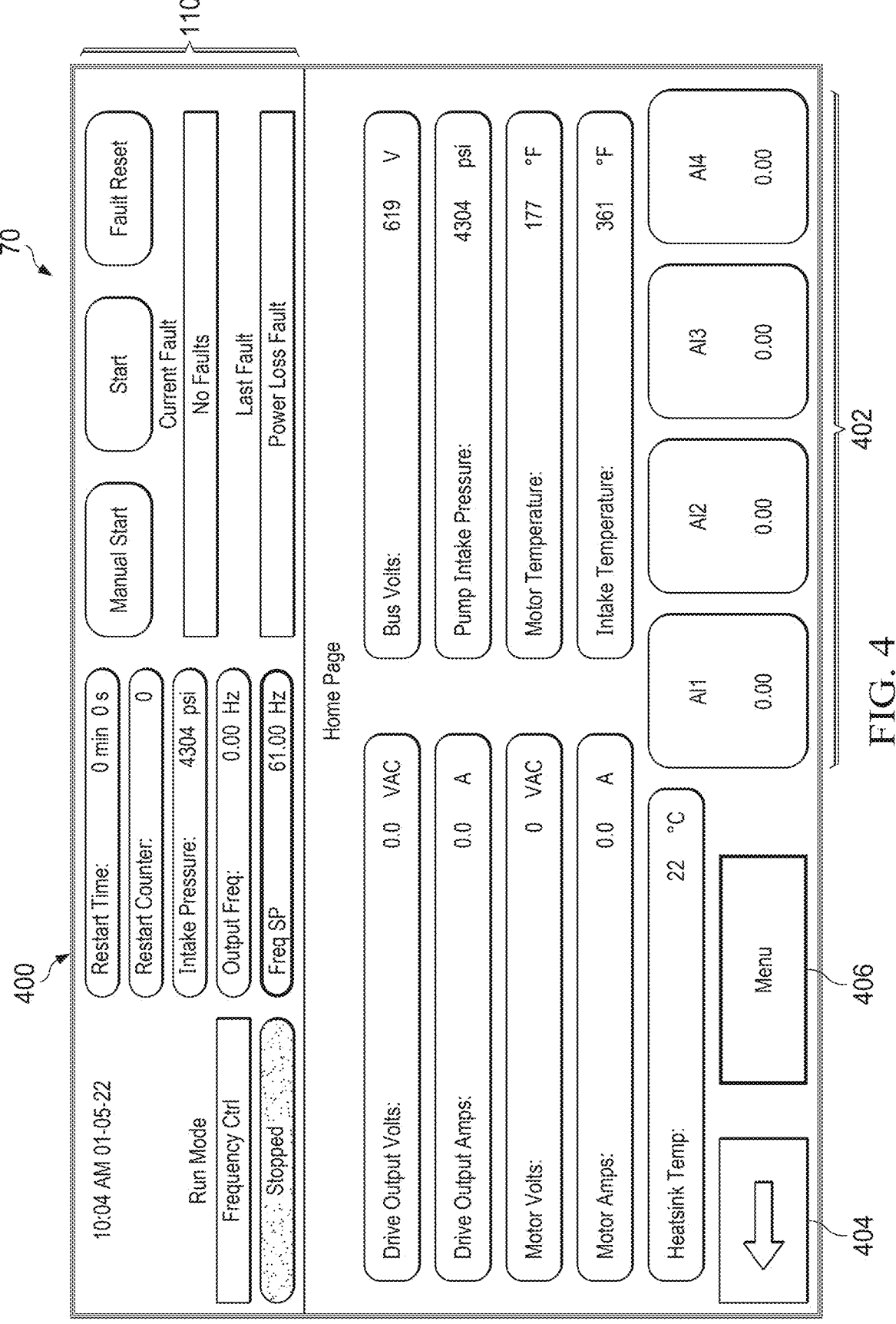
FIG. 4 is a screen shot of the home page displayed by the human machine interface of the invention.

Referring now to FIG. 4, home page screen 400 displays parameters that an operator may monitor while variable speed drive 42 is running. Each parameter is labeled with its description and provides current data. For example, analog input data fields 402 are optionally displayed in the lower right corner of home page 400. Activation of back button field 404 returns the display to a previously viewed screen. Activation of menu button field 406 changes the display of touch screen 70 to menu page 500 (discussed below), which are specific to ESP application.

Figure 5:
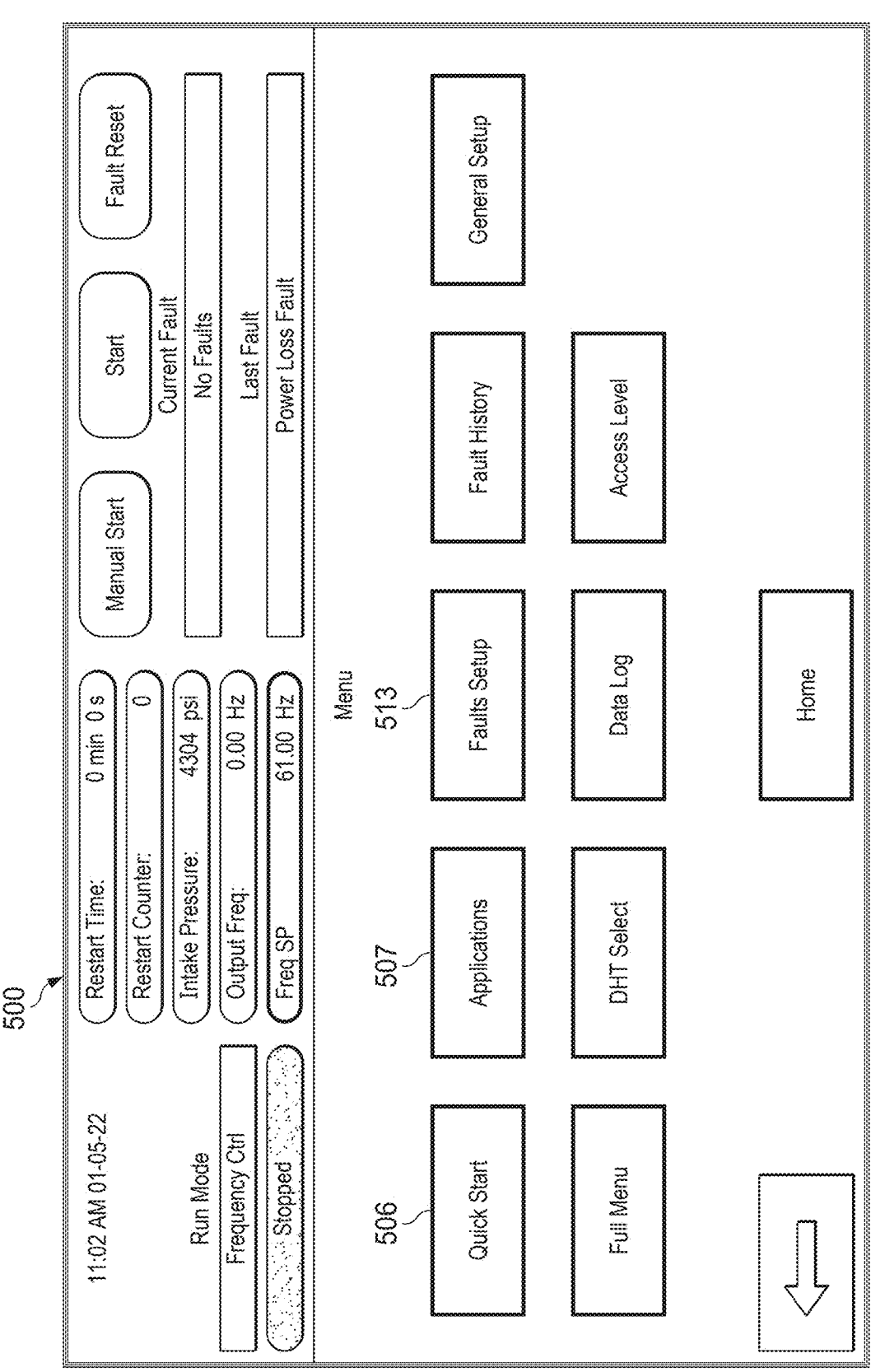
FIG. 5 is a screen shot of the menu page displayed by the human machine interface of the invention.

Referring now to FIG. 5, menu page 500 provides selection of ESP specific set-up pages. Each of the pages that may be selected are described subsequently below. Menu page 500 presents quick start button field 506. Activation of quick start button field 506 will call up quick start screen 600, discussed below. Activation of applications button field 507 calls up applications screen 700, discussed below. Activation of faults set up button field 513 calls up fault set up screen 1100, discussed below.

Figure 6:
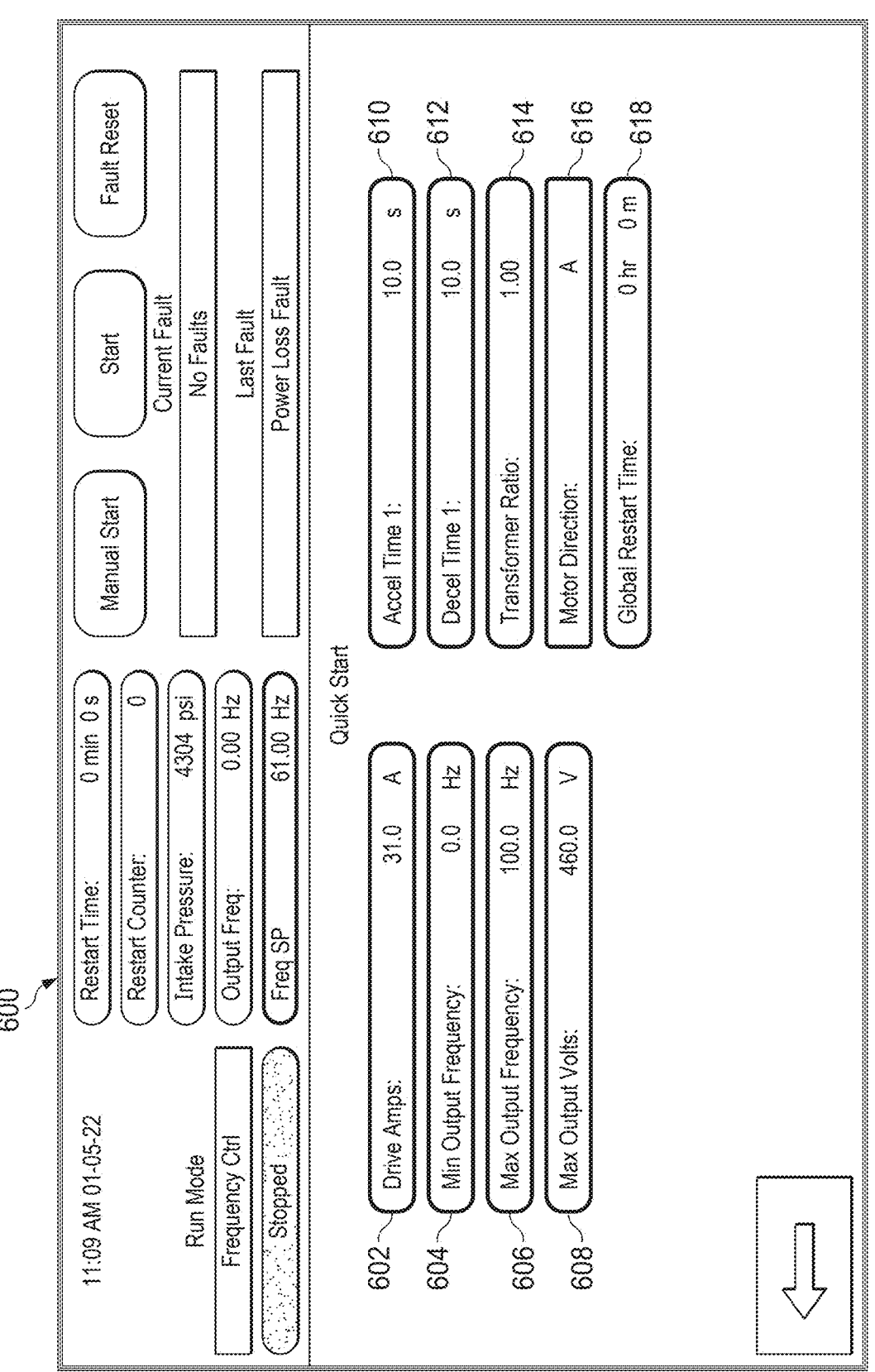
FIG. 6 is a screen shot of the quick start page displayed by the human machine interface of the invention.

Referring now to FIG. 6, quick start screen 600 provides for setting of parameters typically required for an ESP application. For example, drive amps field 602 provides an ability to set setting maximum amps of motor 22 permitted by variable speed drive 42 to provide output protection, e.g., drive amps field 602 may be set at 10% to 200% of a rated current of variable speed drive 42.

Min output frequency field 604 provides an ability to set a minimum output frequency limit for variable speed 42. The setting of min output frequency field 604 will determine the minimum setpoint frequency when entering the desired frequency setpoint in freq SP field 140 on banner page screen 100.

Max output frequency field 606 provides an ability to set a maximum output frequency limit. The setting of max output frequency field 606 will determine the maximum setpoint frequency when entering the desired frequency setpoint in frequency SP field 140 on banner page screen 100. Max output volts field 608 provides an ability to set a maximum output volts limit of the variable speed drive 42. Accel time 1 field 610 provides an ability to set a time required for variable speed drive 40 to accelerate from a minimum frequency to a maximum frequency. Decel time 1 field 612 provides an ability to set setting a time required for variable speed drive 42 to decelerate from a maximum frequency to a minimum frequency.

Transformer ratio field 614 provides an ability to enter a transformer ratio, which is typically specified on a name plate of transformer 34 (FIG. 1). The transformer ratio field 614 setting is used to calculate downhole electrical parameters.

Motor direction field 616 presents a two state button that allows selection of a desired direction of motor 22 via variable speed drive 42, i.e., either direction A or direction B.

Global restart time field 618 provides an ability to set a restart time for all fault restarts even though individual fault restart times can be edited separately. The restart time sets the amount of delay time before starting that occurs when auto/man start button 118 is set to auto start and start button 112 is actuated.

Figure 7:
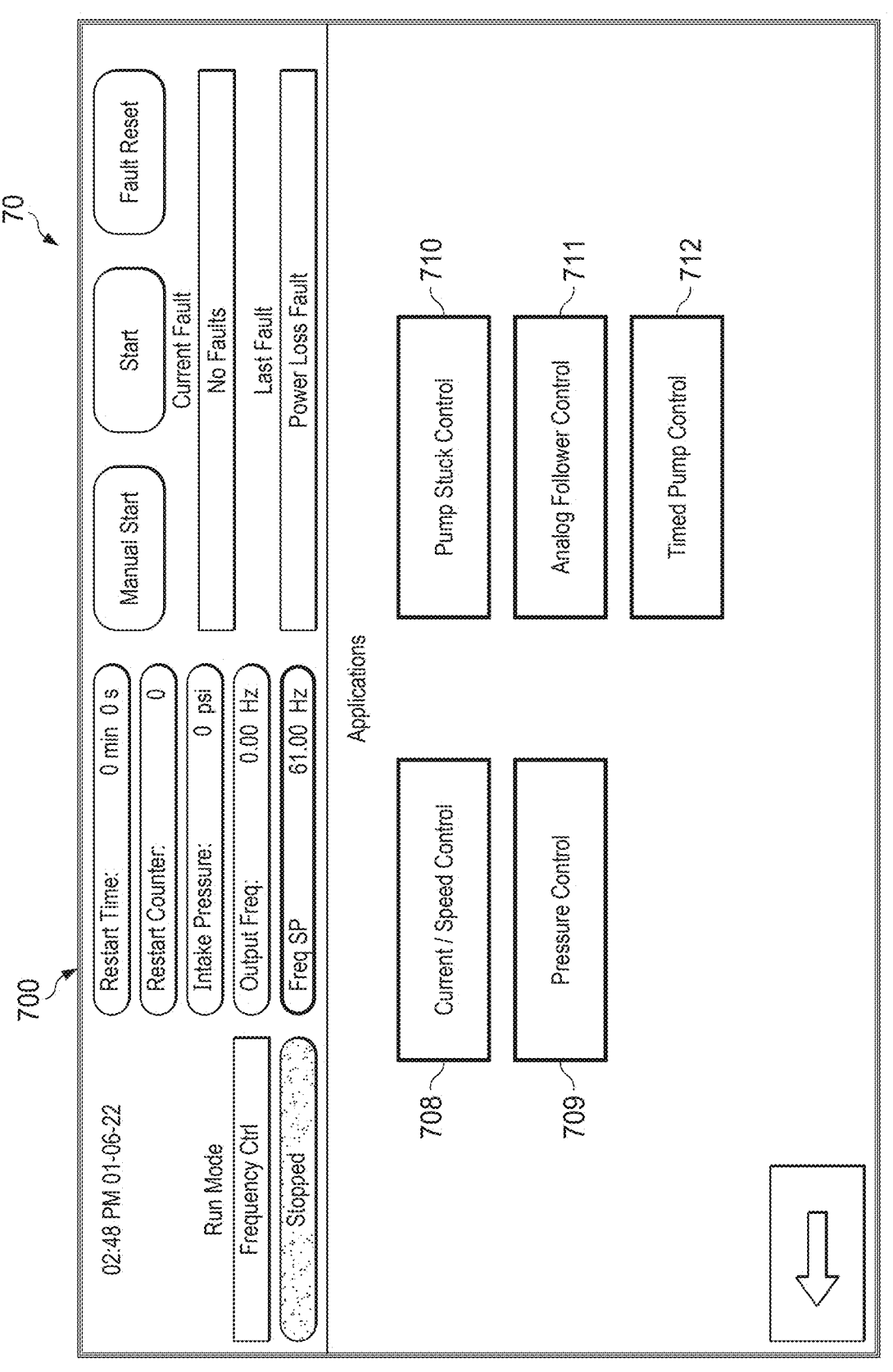
FIG. 7 is a screen shot of the applications page displayed by the human machine interface of the invention.

Referring now to FIG. 7, applications screen 700 presents a menu of possible choices of applications, each of which is covered below, namely current/speed control field 708, pressure control field 709, pump stuck control field 710, analog follower control field 712, and time pump control field 714

When a current/speed control application is selected via current/speed control field 708, current/speed control screen 800 (FIG. 8) is displayed. When a pressure control application is selected via pressure control field 709, pressure control screen 900 (FIG. 9) is displayed. When a pump stuck control application is selected via pump stuck field 710, pump stuck control screen 1000 (FIG. 10) is displayed. When an analog follower control is selected via analog follower field 711, analog follower control 1100 (FIG. 11) is displayed. When a timed pump control application is selected via timed pump control 712, timer pump control 1200 (FIG. 12) is displayed.

Figure 8:
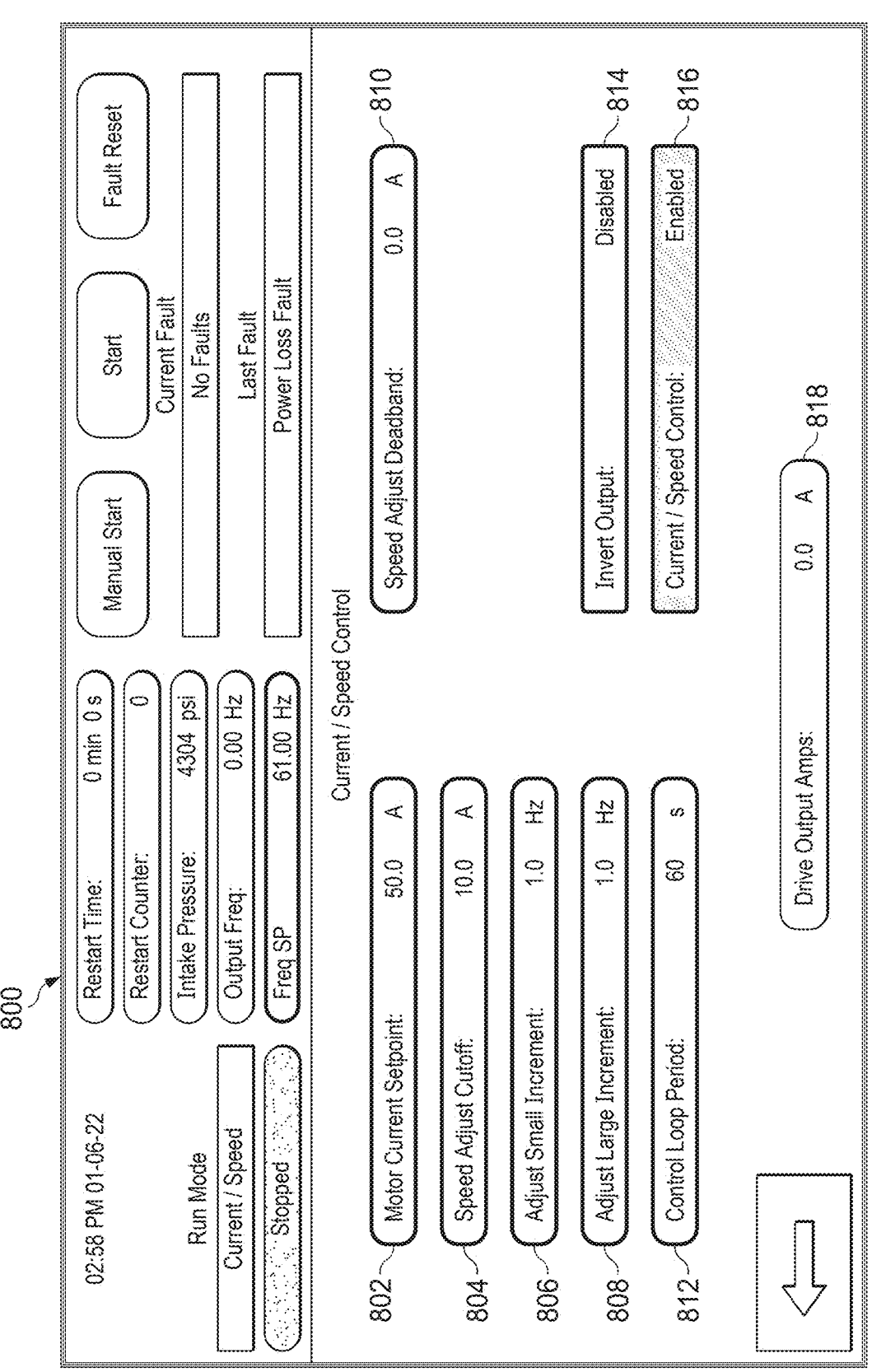
FIG. 8 is a screen shot of the current/speed control page displayed by the human machine interface of the invention.

As set forth above, current/speed control field 708 of applications screen 700 (FIG. 7) enables the current/speed control application and calls up current/speed control screen 800 (FIG. 8). The current/speed control application is used when a desired control setpoint is current draw, e.g., in amps. When the current/speed control application is activated, control system 40 will adjust the frequency of motor 22 via variable speed drive 42 as required to maintain the desired current setpoint.

Motor current setpoint field 802 provides an ability to enter a desired motor current setpoint in amps.

Speed adjust cutoff field 804 provides an ability to enter cutoff amps, which is a speed adjust cutoff limit, above and below the motor current setpoint entered in motor current setpoint field 802, at which frequency adjustment changes between large increment and small increment.

Adjust small limit field 806 provides for entry of a frequency adjust small limit, which is an amount the frequency will change in steps while inside the speed adjust cutoff limit. Adjust large limit field 808 provides for entry of the frequency adjust large limit, which is the amount a frequency will change in steps while outside of the speed adjust cutoff limit.

Speed adjust dead-band field 810 provides for entry of a dead-band such that when actual current draw is within the permissible limit of the dead-band, control system 40 will be satisfied and will not continue to adjust. A reasonable amount of dead-band keeps control system 40 from constantly adjusting or hunting.

Control loop period field 812 provides for entry of a time between steps of frequency adjustment.

Invert output field 814 presents a two state button that switches between increasing control variable to achieve setpoint, and decreasing control variable to achieve setpoint.

Current/speed control-enable/disable field 816 presents a two state button that selects between enable, meaning activate, and disable, meaning deactivate. When enabled, run mode display 132 in banner display 110 will indicate, "Current Speed Control".

Drive output amps field 818 presents a display of present time output current in Amps.

Figure 9:
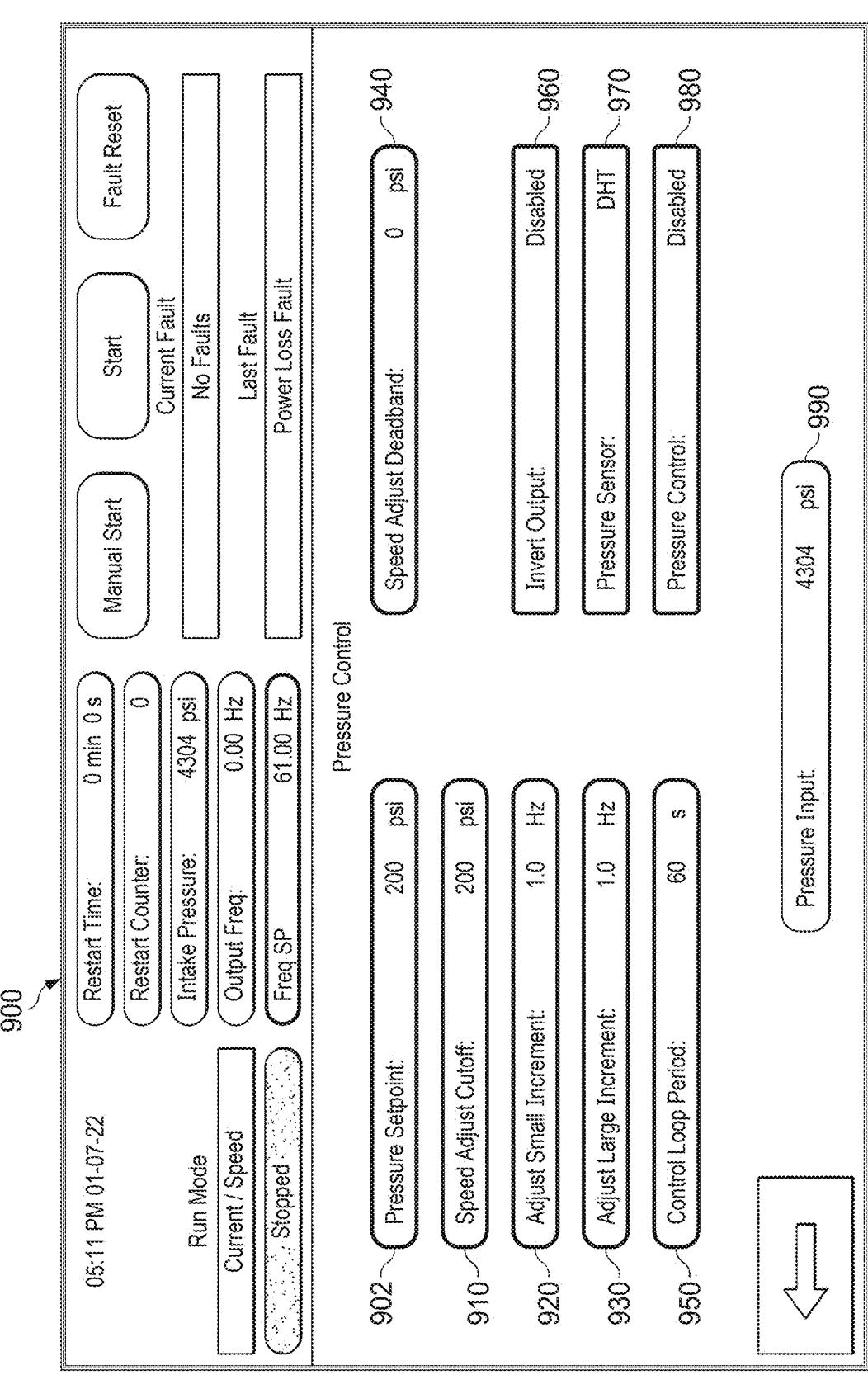
FIG. 9 is a screen shot of the pressure control page displayed by the human machine interface of the invention.

Referring now to FIG. 9, pressure control screen 900 allows control of a pressure control application that is used when a desired control setpoint is a desired pressure setpoint. When pressure control mode is activated, control system 40 will adjust the frequency of motor 22 via variable speed drive 42 as required to maintain the desired pressure setpoint. The pressure reference can be selected as a downhole pressure, or a pressure signal connected to an analog input.

Pressure setpoint field 902 provides for entry of a desired pressure setpoint in amps.

Speed adjust cutoff field 910 provides for entry of a cutoff pressure, which is a speed adjust cutoff limit, above and below the pressure setpoint, at which a frequency adjustment changes between large increment and small increment.

Adjust small increment field 920 provides for entry of a frequency adjust small increment, which is an amount the frequency will change in steps while inside the speed adjust cutoff limit.

Adjust large increment 930 provides for entry of a frequency adjust large limit, which is an amount the frequency will change in steps while outside of the speed adjust cutoff limit.

Speed adjust dead-band 940 provides for entry of a dead-band such that when the actual pressure is within the permissible dead-band, control system 40 will be satisfied and will not continue to adjust. A reasonable amount of dead-band keeps control system 40 from constantly adjusting or hunting.

Control loop period field 950 provides for entry of a time between steps of frequency adjustment.

Invert output field 960 is a two state button that switches between increasing control variable to achieve setpoint, and decreasing control variable to achieve setpoint.

Pressure sensor field 970 is a nine state selector switch that advances through a list of possible pressure signal sources. The options are DHT, or any one multiple analog inputs.

Pressure control-enable/disable field 980 is a two state button that selects between enable (meaning activate), and disable, meaning deactivate. When enabled, run mode display 132 in banner display 110 will indicate, "Pressure Control".

Pressure input field 990 is a display of present time pressure input in psi.

Figure 10:
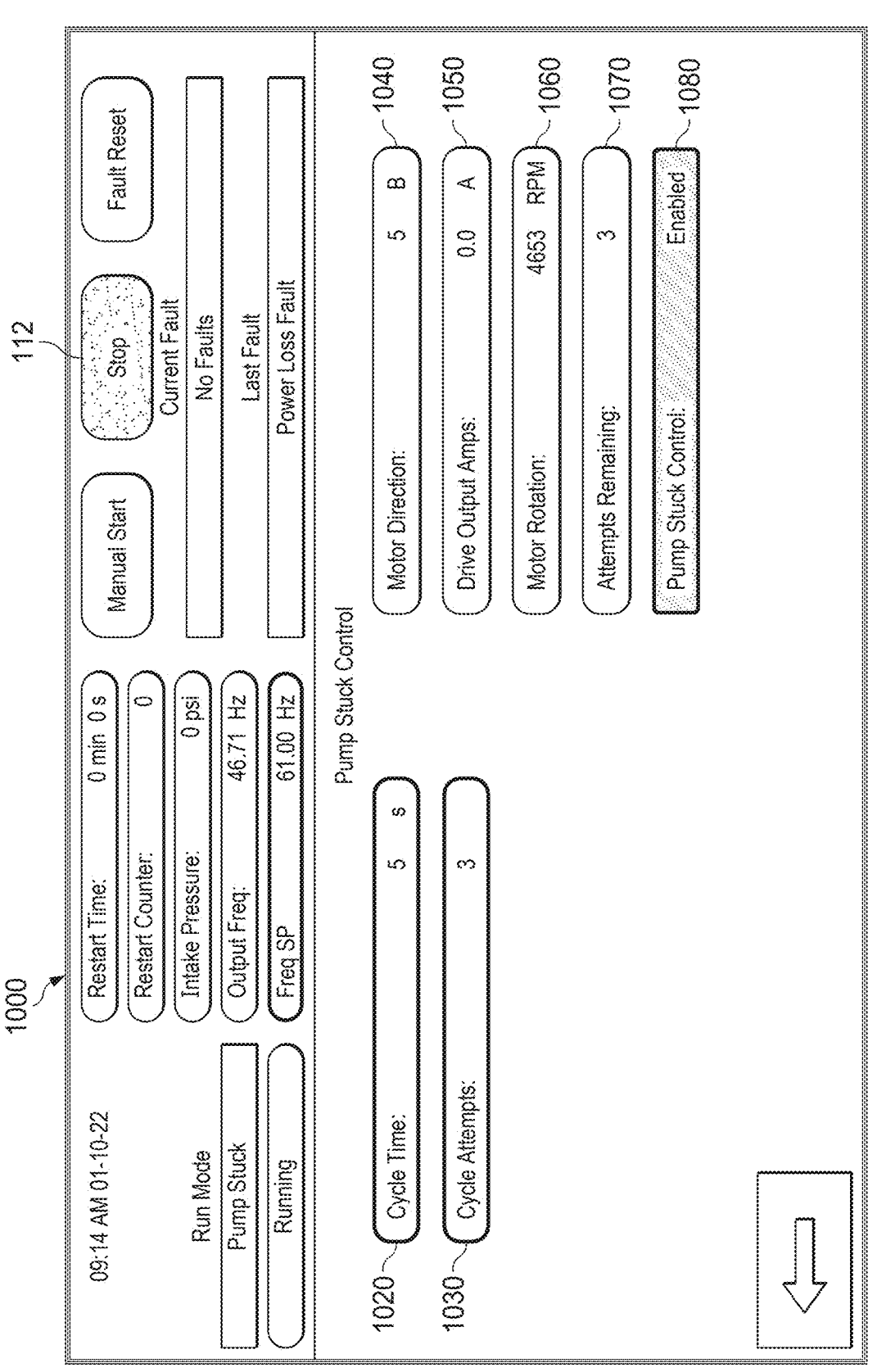
FIG. 10 is a screen shot of the pump stuck control page displayed by the human machine interface of the invention.

Selection of pump stuck control field 710 from applications screen 700 (FIG. 7) calls up pump stuck control screen 1000 (FIG. 10) and instigates pump stuck control mode. Pump stuck control mode provides a means of breaking loose stuck pumps. Referring now to FIG. 10, pump stuck control enable/disable field 1080 must be enabled and start/stop 112 button engaged to start. At this point, control system 40 will execute the following steps:

1. Start.
2. Run for the preset amount time as set by the cycle time function.
3. Stop.
4. Restart in the opposite direction.

The above process steps will repeat a number of times equal to the number of times set in cycle attempts field 1030.

Cycle time field 1020 provides for entry of a desired time that variable speed drive 42 will run in one direction before stopping and restarting in the other direction. Cycle attempts field 1030 provides for entry of a desired number of times variable speed drive 42 will cycle.

Motor direction field 1040 displays the present direction of motor 22. Drive output amps field 1050 displays the present output amps of variable speed drive 42. Motor rotation field 1060 displays present speed of motor 22 in RPM.

Attempts remaining field 1070 displays the number of cycle attempts remaining, after which the control will stop and will no longer attempt to cycle.

Pump stuck control-enable/disable field 1080 is a two state button that selects between enable, meaning activate, and disable, meaning deactivate. When enabled, run mode display 132 in banner display 110 will indicate, "Pump Stuck Control".

Figure 11:
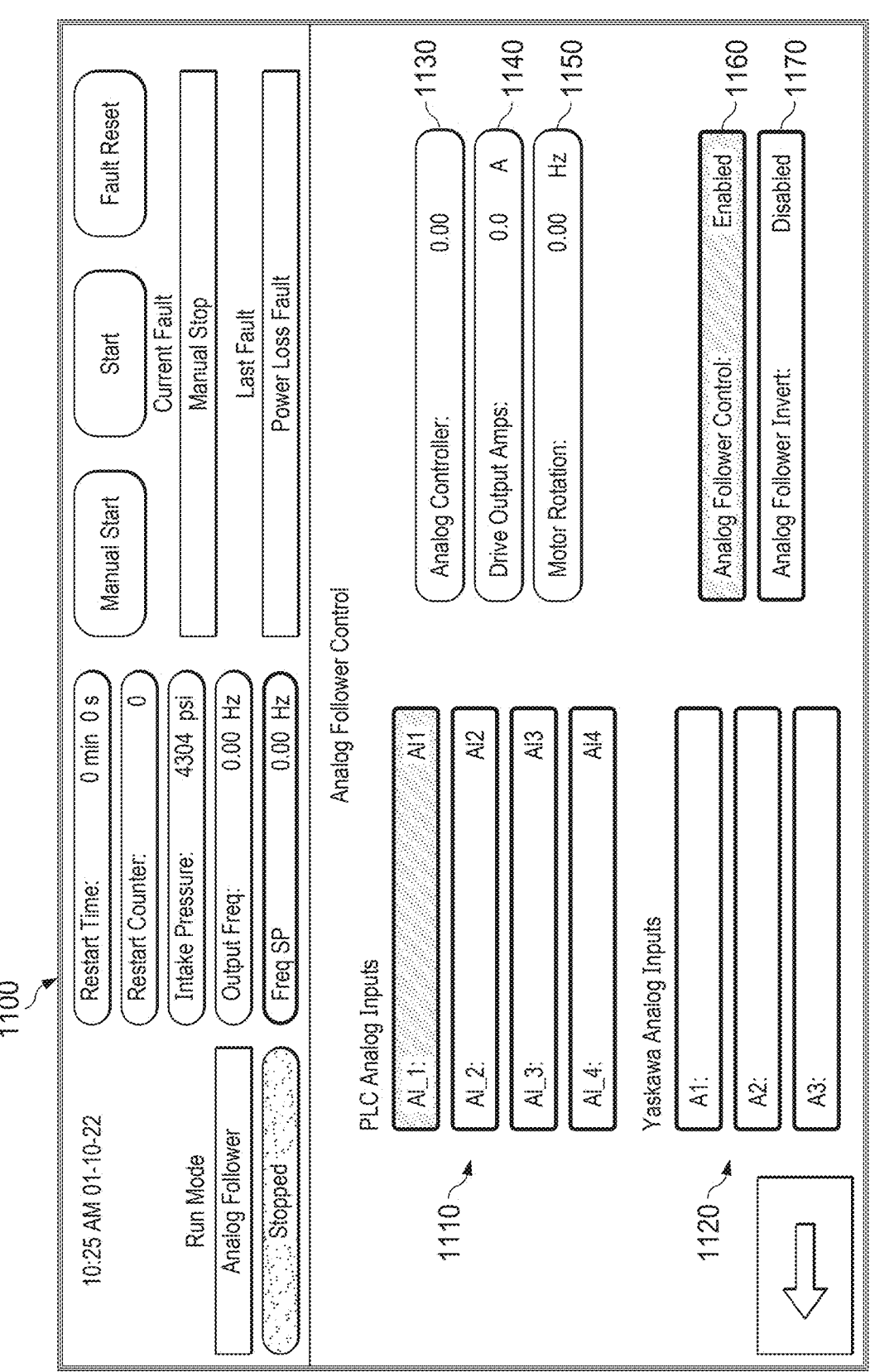
FIG. 11 is a screen shot of an analog follower control page displayed by the human machine interface of the invention.

Referring now to FIG. 11, analog follower control screen 1100 provides a means of controlling the drive frequency based on an analog input signal. PLC analog inputs field 1110/Yaskawa analog inputs field 1120 allow for selection of any one of four PLC analog inputs or one of three Yaskawa analog inputs as control variable speed drive 42.

Analog controller field 1130 displays the present analog input signal value. Drive output amps field 1140 displays present drive output current in amps. Motor rotation field 1150 displays the present drive output frequency in Hz.

Analog follower control-enable/disable field 1160 is a two state button that selects between enable, meaning activate, and disable, meaning deactivate. When enabled, run mode display 132 in banner display 110 will indicate, "Analog Follower Control".

Analog follower invert field 1170 is a two state button that switches between increasing control variable to achieve setpoint, and decreasing control variable to achieve setpoint.

Figure 12:
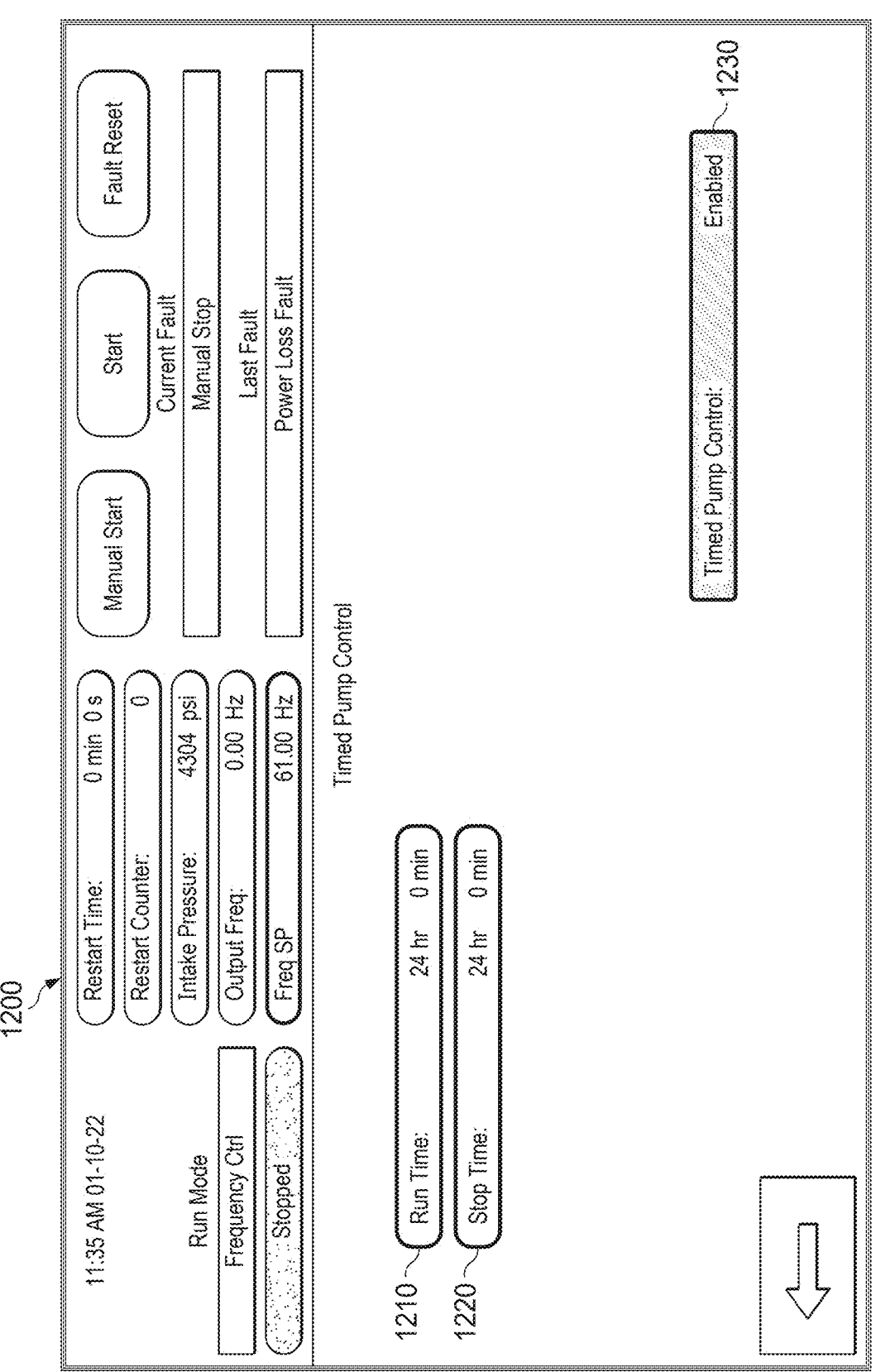
FIG. 12 is a screen shot of a time pump control page displayed by the human machine interface of the invention.

Referring now to FIG. 12, timed pump control screen 1200 provides a means of setting a period which variable speed drive 42 will be running and a period which it will be stopped. Run time field 1210 provides for entry of an amount of time, in hours and minutes, in which variable speed drive 42 will be continuously running, after which variable speed drive 42 will stop for the amount of time set in stop time field 1220.

Stop time field 1220 provides for entry of the amount of time, in hours and minutes, in which the drive will be stopped, after which the drive will start and run for the amount of time set in run time field 1210.

Timed pump control-enable/disable field 1230 is a two state button that selects between enable, meaning activate, and disable, meaning deactivate. When enabled, run mode display 132 in the banner display 110 will indicated, "Timed Pump".

Figure 13:
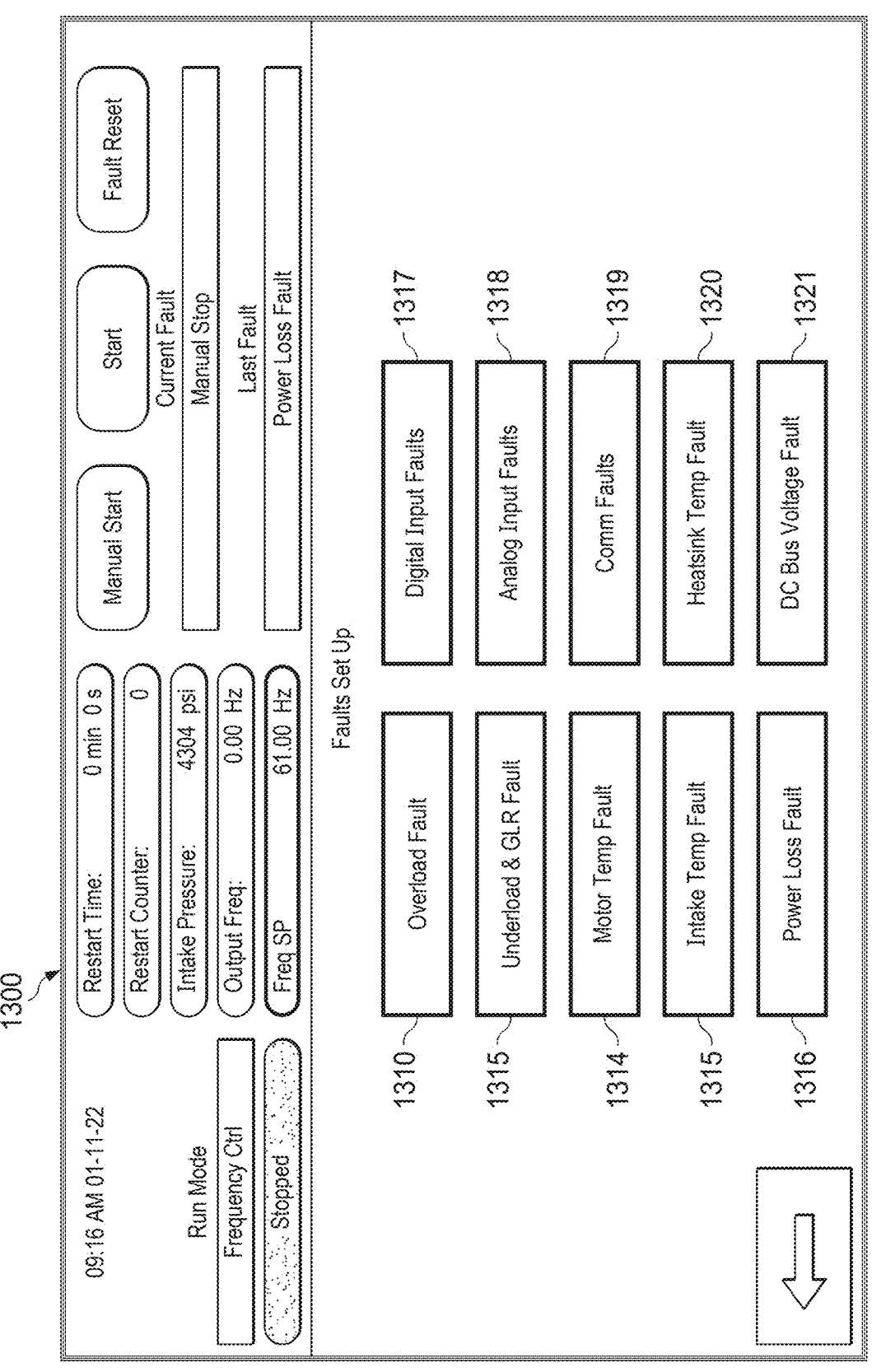
FIG. 13 is a screen shot of a faults set-up control page displayed by the human machine interface of the invention.

Referring now to FIG. 13, faults set-up screen 1300 (FIG. 13) is called up by fault set-up button 513 from menu screen 500 (FIG. 5). Faults set-up screen 1300 presents a menu that provides for selection of ten possible fault set-up screens. Once selected, a page is displayed with parameters available to set up and monitor characteristics of a specific fault such as set point value, bypass time, trip delay time, restart delay time, restart limit and reset delay. Faults set-up screen 1300 presents overload fault field 1310, underload and gas lock recovery (GLR) fault field 1315, which calls up underload fault and GLR screen 1500, motor temperature fault field 1314, intake temperature fault field 1315, power loss fault field 1316, digital input faults field 1317, analog input faults field 1318, communication faults field 1319, heatsink temperature fault field 1320, and DC bus voltage fault field 1321.

Figure 14:
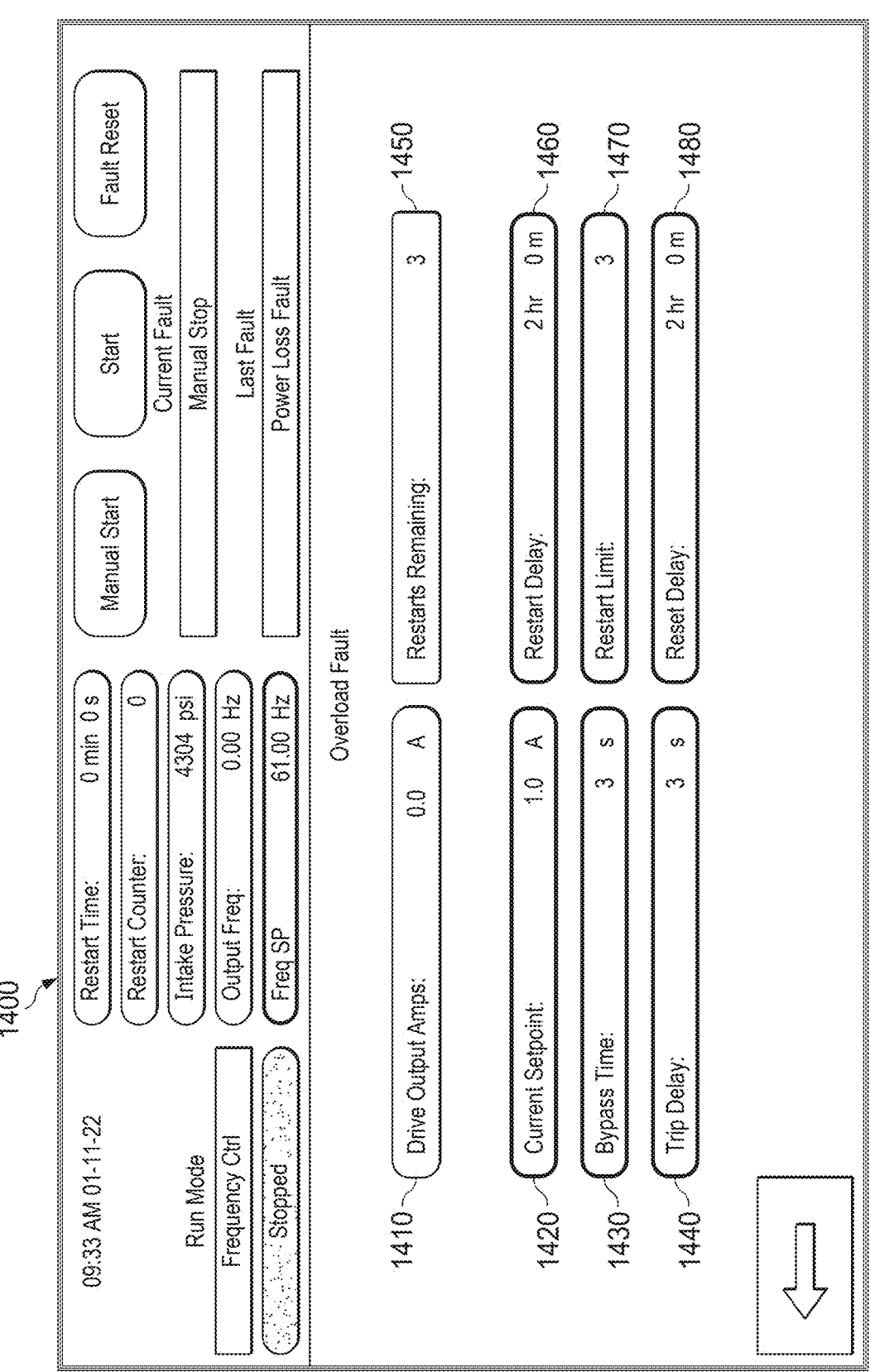
FIG. 14 is a screen shot of an overload fault control page displayed by the human machine interface of the invention.

Overload fault-set-up screen 1400 (FIG. 14) provides for entry and display of parameters that control the reaction of variable speed drive 42 during an overload occurrence. An overload fault occurs when the drive output current exceeds the current setpoint entered on the overload fault screen, for an amount of time exceeding the trip delay time entered.

Drive output amps field 1410 is a display of present drive output current load in amps. Current setpoint field 1420 provides for entry of a desired current setpoint in amps. The current setpoint is the maximum allowable amps limit which, when exceeded, will begin the countdown of trip delay time, which is entered in trip delay field 1440, below.

Bypass time field 1430 provides for entry of desired bypass time in seconds. Bypass time is a period after starting the drive when an overcurrent condition will be ignored.

Trip delay field 1440 provides for entry of desired trip delay time in seconds. Trip delay is a period after the setpoint limit is exceeded when it is ignored before the fault routine begins.

Restarts remaining field 1450 is a display of the number of automatic restart attempts available, after which no restart attempt will be made.

Restart delay field 1460 provides for entry in hours and minutes, of the desired time delay after a fault occurs, until the control system will attempt to automatically restart the drive.

Restart limit field 1470 provides for entry of the desired number of automatic restart attempts which will occur.

Reset delay field 1480 provides for entry of the amount of time, in hours and minutes, after restart attempts has decremented, during which a fault does not occur, and the restart attempts will be reset to the desired entry.

Figure 15:
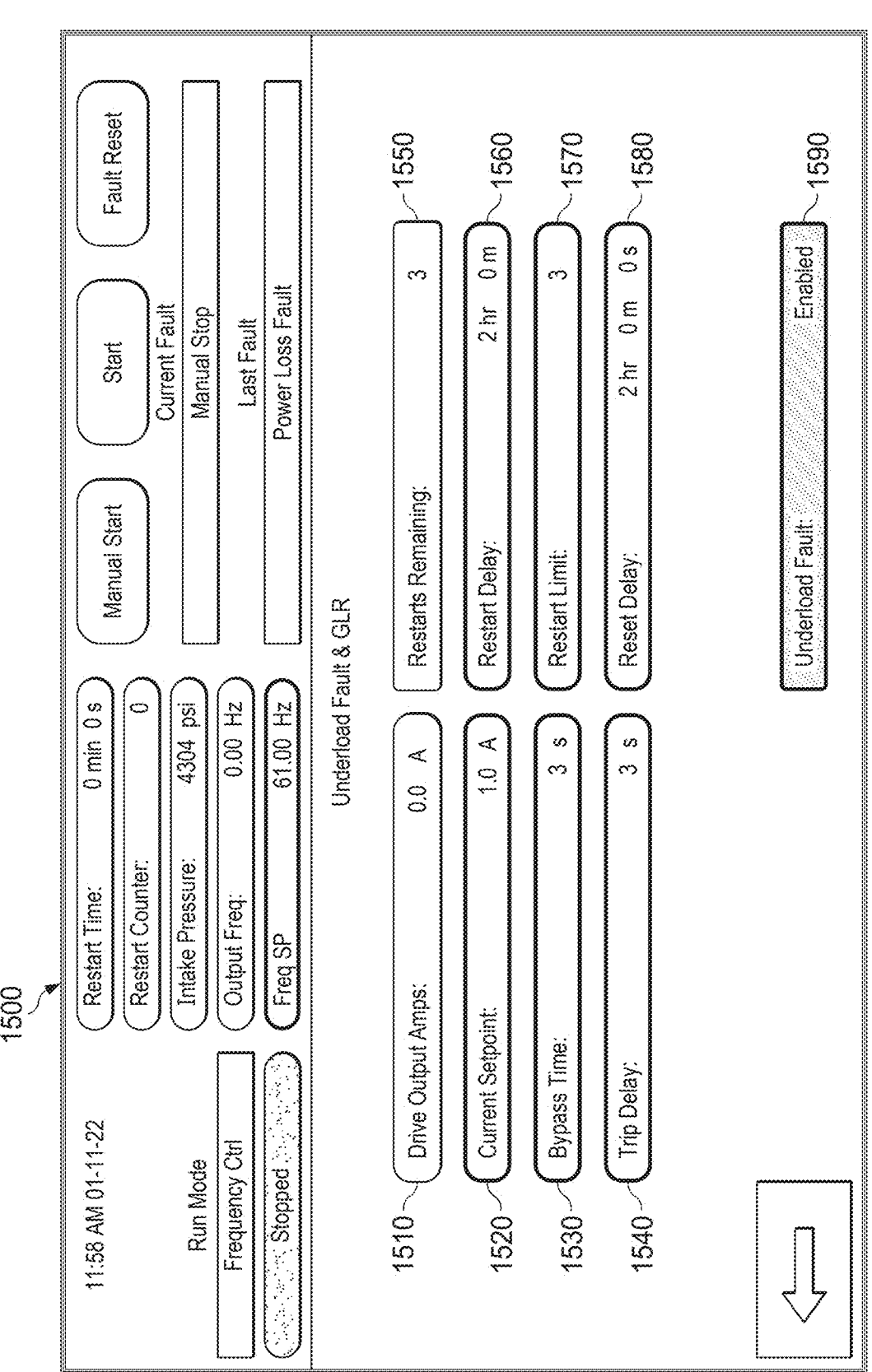
FIG. 15 is a screen shot of an underload fault and GLR control page displayed by the human machine interface of the invention.

Referring now to FIG. 15, underload fault & GLR screen 1500 provides for entry and display of parameters that control the reaction of variable speed drive 42 during an underload fault occurrence. An underload fault occurs when the drive output current, indicated in drive output current field 1510, is less the current setpoint, indicated in current setpoint field 1520 entered on underload fault screen 1500, for an amount of time exceeding the trip delay time entered.

Drive output amps field 1510 is a display of present drive output current load in amps.

Current setpoint field 1520 provides for entry of a desired minimum current setpoint in amps. The current setpoint is the minimum allowable amps limit which, if exceeded, will begin the countdown of trip delay time.

Bypass time field 1530 provides for entry of desired bypass time in seconds. Bypass time is a period after starting the drive when an undercurrent condition will be ignored.

Trip delay field 1540 provides for entry of desired trip delay time in seconds. Trip delay is a period after the setpoint limit is exceeded when it is ignored before the fault routine begins.

Restarts remaining field 1550 is a display of the number of automatic restart attempts available, after which no restart attempt will be made.

Restart delay field 1560 provides for entry in hours and minutes, of the desired time delay after a fault occurs and is then resolved, until the control system will attempt to automatically restart the drive.

Restart limit field 1570 provides for entry of the desired number of automatic restart attempts which will occur.

Reset delay field 1580 provides for entry of the amount of time, in hours and minutes. The reset delay is the amount of time after a restart that there has not been a subsequent fault, therefore the attempts remaining is reset to equal the attempts limit setting.

Underload fault—enable/disable/GLR mode button field 1590 presents a three state selector with options to enable underload faults, disable underload faults or switch to GLR mode. GLR mode opens GLR screen 1600 with additional parameters.

Figure 16:
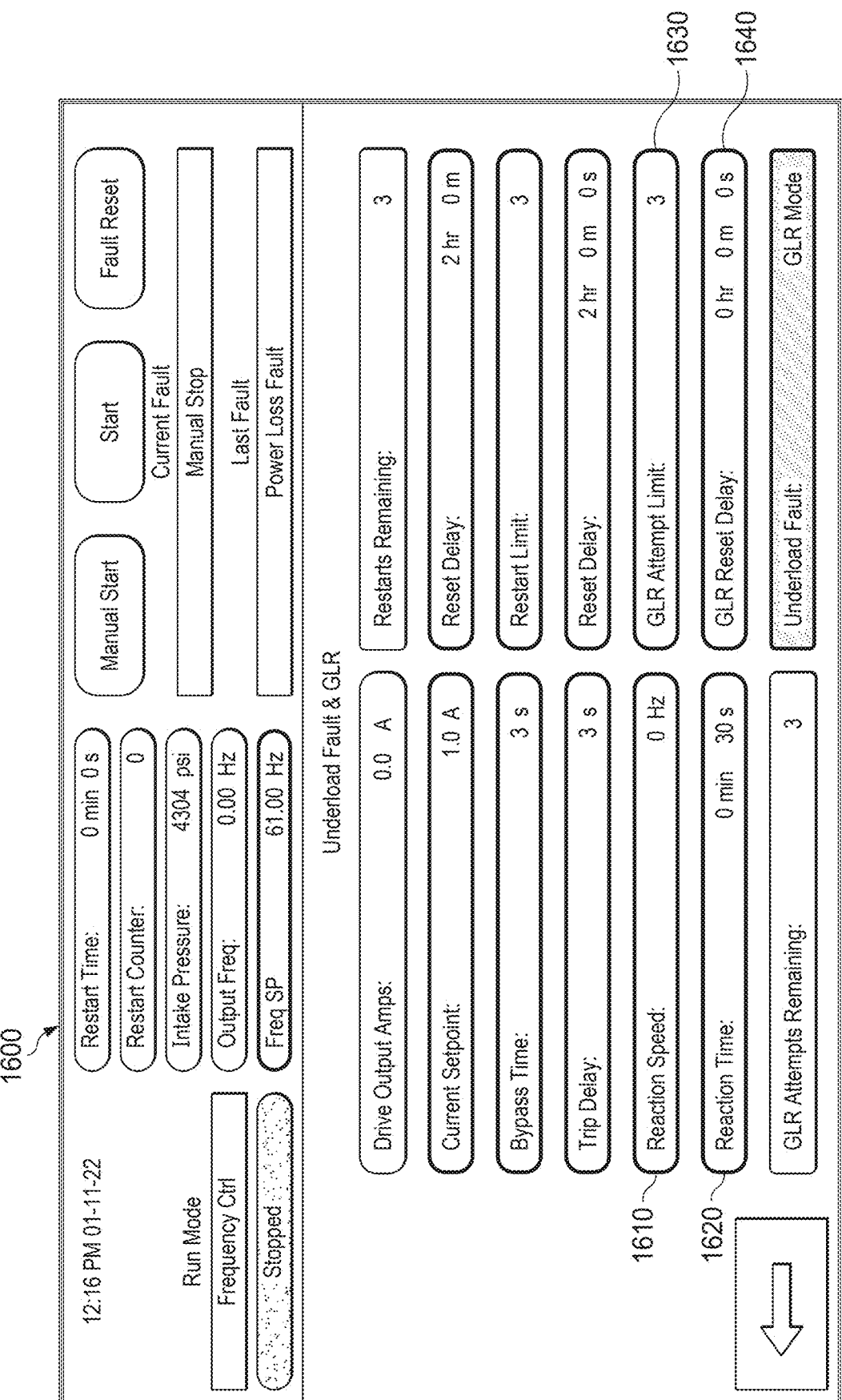
FIG. 16 is a screen shot of an underload fault and GLR control page displayed by the human machine interface of the invention, wherein CLR mode has been selected and additional parameters are preselected.

For example, when the GLR Mode is selected with enable/disable GLR mode button field 1590, underload fault and GLR screen 1600 presents additional parameters shown in FIG. 16. The underload fault routine is at first bypassed so that the GLR routine may be executed. During an underload occurrence, the GLR process will change the frequency of variable speed drive 42 to an entered reaction speed parameter for an amount of time entered for the reaction time, for as many attempts as is entered in GLR attempts limit 1630. If the GLR process fails to clear the underload situation, the underload fault routine will take effect.

Reaction speed field 1610 provides for entry of desired reaction speed of the variable speed drive 42 in HZ. The desired reaction speed is the speed that will take effect when the GLR mode is initiated following an underload condition.

Reaction time field 1620 provides for entry of desired reaction time in minutes and seconds. The desired reaction time is the amount of time that variable speed drive 42 will remain at the reaction speed.

GLR attempt limit field 1630 provides for entry of desired number of times the GLR routine will be implemented, after which the underload fault routine will take effect.

GLR reset delay field 1640 provides for entry of the reset delay in hours, minutes, and seconds. The reset delay is the amount of time after a restart that there has not been a subsequent fault. Therefore, the GLR attempts remaining is reset to equal the GLR attempt limit setting.

Figure 17A:
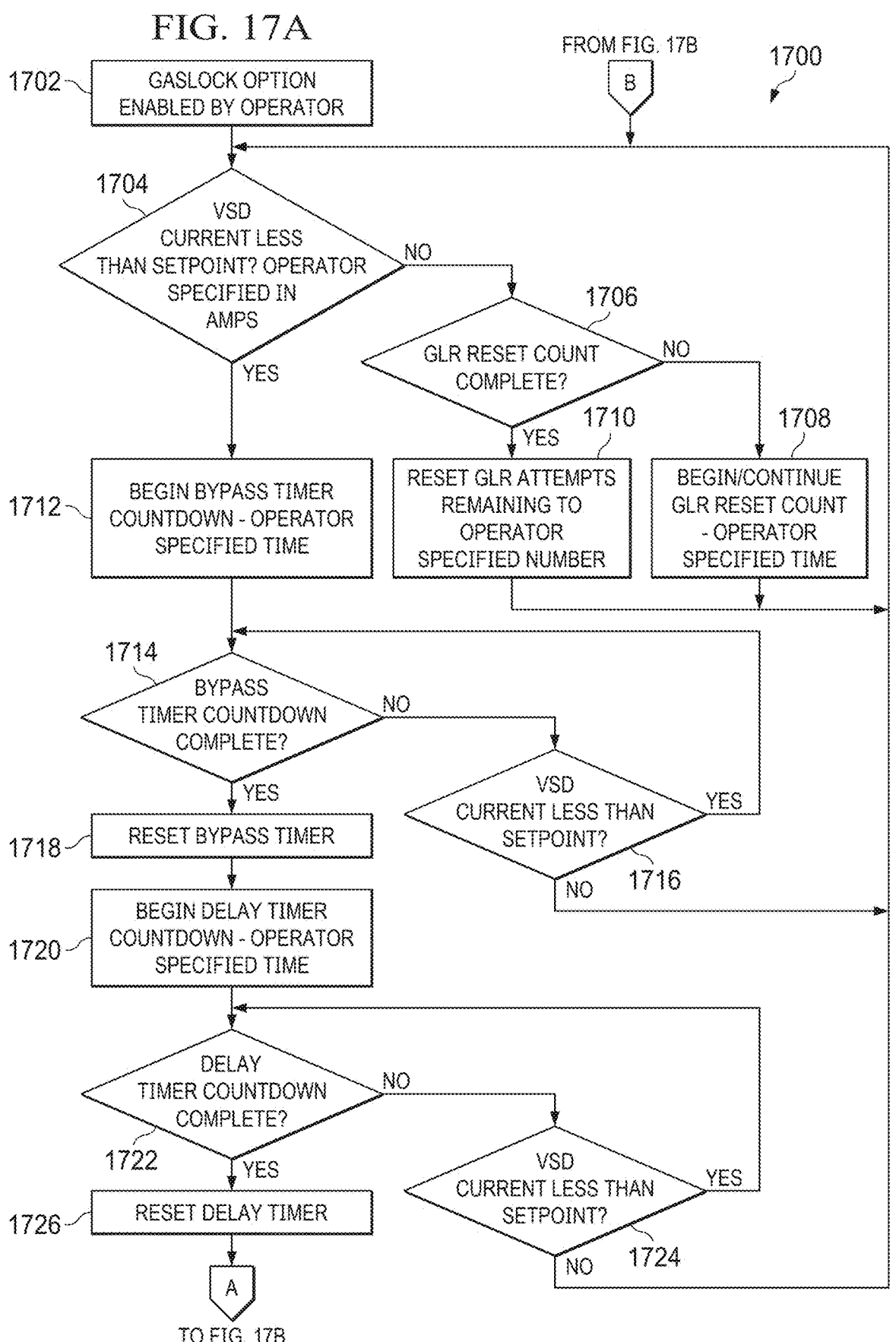
FIG. 17A is a flowchart of a method of clearing a gas lock.
Figure 17B:
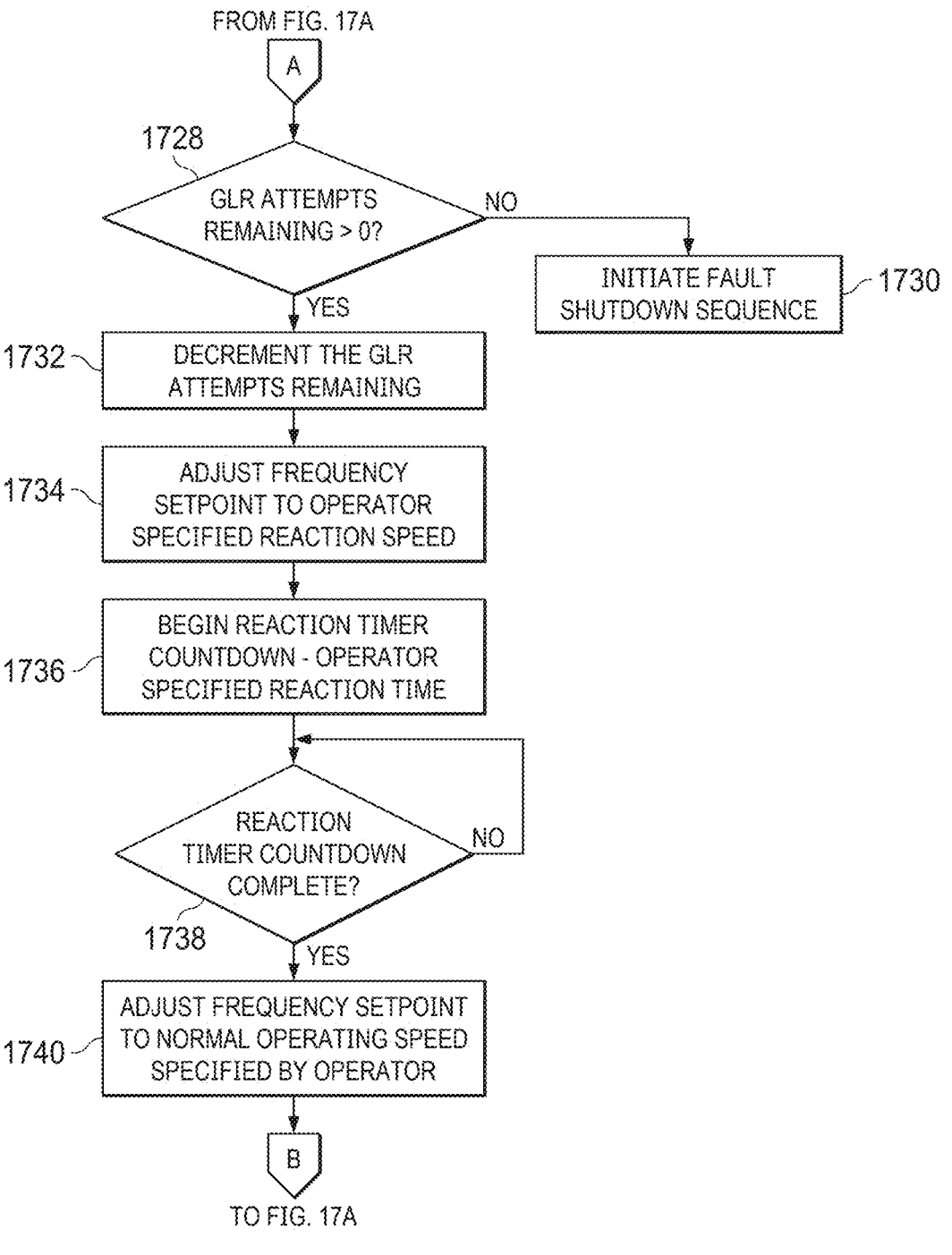
FIG. 17B is a flowchart of a method of clearing a gas lock.

An example method of implementing gas lock recovery includes the following steps, as set forth in the flowchart of FIGS. 17A and 17B, designated generally 1700. The steps are preferably executed by PLC controller 50 and communicated to an operator via touch screen 70 of human interface 60. The first step, i.e., step 1702, is entry of a gas lock option enabled by an operator, e.g., the operator engages enable/disable GLR mode button 1590.

A determination is made in step 1704 whether variable speed drive current is less than a setpoint, which is operator specified in amps, i.e., the motor current is compared to motor current setpoint entered in motor current setpoint field 802.

If the motor current is greater than the setpoint per step 1704, then a determination is made in step 1706 whether the GLR Reset count is complete, i.e., as indicated in restarts remaining field 1550 and set by an operator in restart limit field 1570.

If the GLR reset count is not complete per step 1706, then control system 40 begins or continues the GLR reset count, per step 1708, i.e., by decrementing the count presented restarts remining field 1550. Then, step 1704 is executed once again.

If the GLR reset count is complete per step 1706, then control system 40 resets GLR attempts remaining to an operator specified number, per step 1710. For example, the number presented in restarts remaining field 1550 is reset to the number entered by an operator in restart limit field 1570. Then, step 1704 is executed once again.

If the motor current is less than the setpoint per step 1704, then the bypass timer countdown is commenced with an operator specified time, i.e., with the time entered by an operator in bypass time field 1530.

A determination is then made whether the bypass timer countdown is complete per step 1714.

If the bypass timer countdown is not complete, per step 1714, then a determination is made in step 1714 whether the variable speed drive current is less than a setpoint, i.e., whether measured motor current is less than a motor current setpoint as entered by an operator in motor current setpoint field 802.

If the bypass timer countdown is not complete, per step 1714, then a determination is made in step 1716 whether the measured variable speed drive current is less than a setpoint, i.e., whether the measured variable speed drive current is less than a setpoint entered by an operator in motor current setpoint field 802.

If the variable current is greater than the setpoint, per step 1716, then the system returns to step 1704.

If the variable current is less than the setpoint, per step 1716, then the system returns to step 1714.

If the bypass timer countdown is complete, per step 1714, then the system resets the bypass timer, per step 1718.

The system then begins delay timer countdown to an operator specified time, per step 1720, i.e., the delay timer is counted down from the time setting entered into restart delay field 1560 by an operator.

A determination is made whether the delay timer countdown is complete in step 1722.

If the delay timer countdown is not complete per step 1722, then a determination is made whether the variable speed drive current is less than a setpoint in step 1724, i.e., whether the measured variable speed drive current is less than a setpoint entered by an operator in motor current setpoint field 802. The system then returns to step 1704.

If the delay timer countdown is complete per step 1722, then the delay timer is reset per step 1726.

A determination is then made whether the gas lock recovery attempts remaining is greater than 0, per step 1728.

If the gas lock recovery attempts remaining is not greater than 0, per step 1728, then a fault shutdown sequence is initiated per step 1730.

If the gas lock recovery attempts remaining is greater than 0, per step 1728, then the gas lock recovery attempts remaining is decremented per step 1732, i.e., the number of attempts entered by an operator in GLR attempt limit field 1630 is decremented.

The frequency setpoint is then adjusted to an operator specified reaction speed, per step 1734, i.e., the frequency setpoint is adjusted to the reaction speed entered by a user in reaction speed field 1620.

The reaction timer countdown is begun from an operator specified reaction time, per step 1736, i.e., a reaction timer countdown counts down from a time entered in reaction time field 1620.

A determination is made whether the reaction timer countdown is complete, per step 1738.

If the reaction timer countdown is not complete per step 1738, then the system returns to step 1738.

If the reaction timer countdown is complete per step 1738, then the system adjusts frequency setpoint to normal operating speed specified by an operator, per step 1740, i.e., to the frequency setpoint entered into Freq SP Field 142 The system then returns to step 1704.

Example

Figure 18:
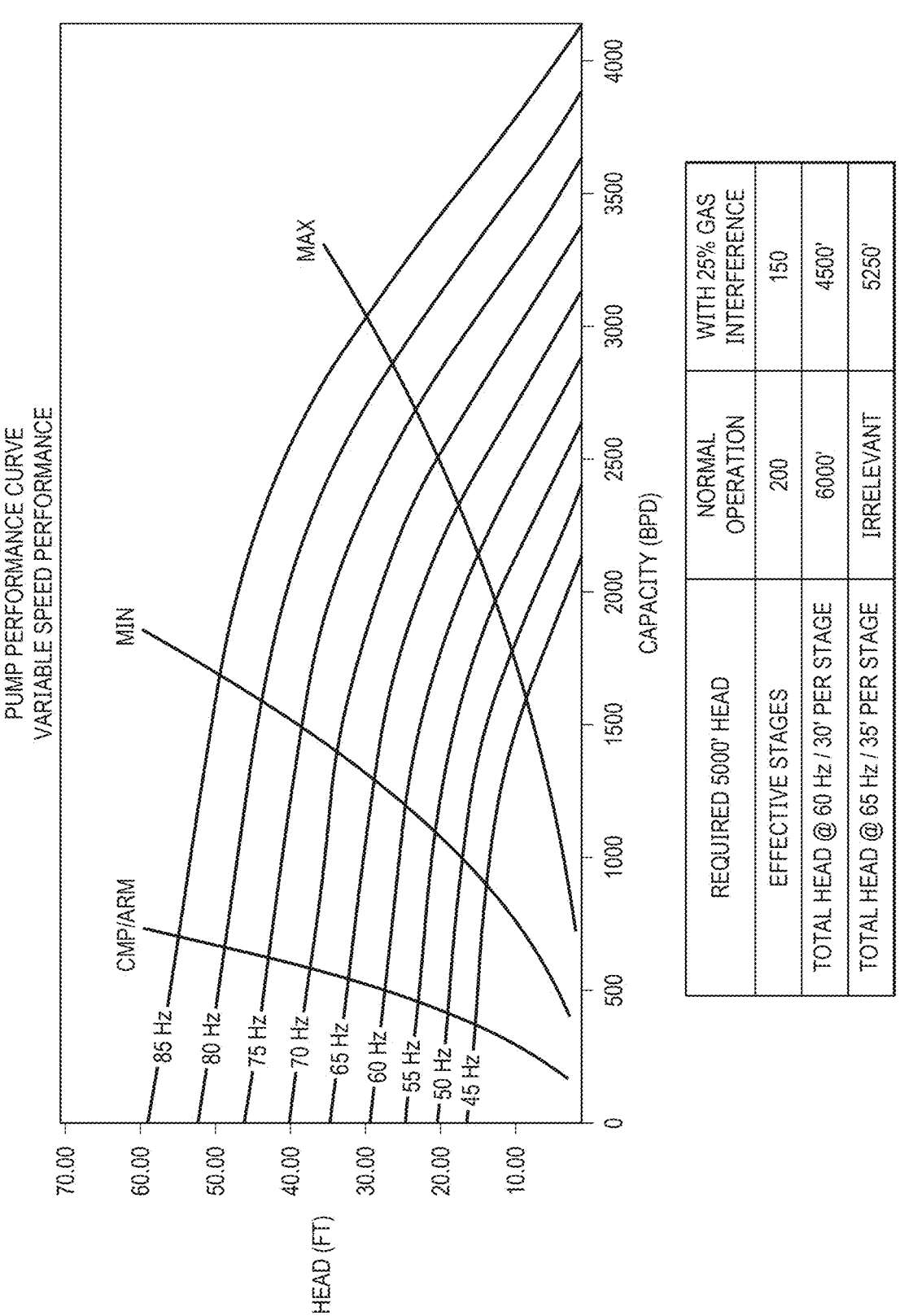
FIG. 18 shows pump performance curve with variable speed performance.

Below is an example of what occurs in a well when gas is introduced into a centrifugal pump. In this example, a well depth of 5000 ft. is specified. The pump design is for 200 stages of the stage type shown in the pump performance curve of FIG. 18, designated 1800, with 30 ft. of head per stage at 60 Hz. The total pump head is calculated by $$200 \text{ stages} \times 30' \text{ head per stage} = 6000' \text{ total head.}$$

This amount of head will be more than enough to surface fluid in a 5000' depth well. Assuming the pump is moving fluid to the surface in normal conditions, as gas is introduced to the pump, the pump performance will decline and produce less head. If gas production increases, the pump head will decline until it cannot surface fluid. Stages nearest the intake are most affected by gas, as the gas is not compressed into solution.

In this example, the pump becomes 25% blocked with gas so that only 75% of the stages are effective. Head is calculated using 75% of 6000'=4500'. 4500' of head is insufficient to move fluid to the surface. Therefore a drop in amps of the motor will occur and the control system will detect gas lock.

By increasing the frequency (Hz) of the pump from 60 Hz to 65 Hz, we can see from pump performance curve 1800 that each stage will develop 35' of head. Total head can now be calculated by $$75\% \times 200 \text{ stages} \times 35' \text{ head per stage} = 5250' \text{ total head.}$$

Therefore, by increasing the frequency by 5 Hz, 5250' of head will be produced, which is sufficient to again move fluid.

Example Data

Figure 19:
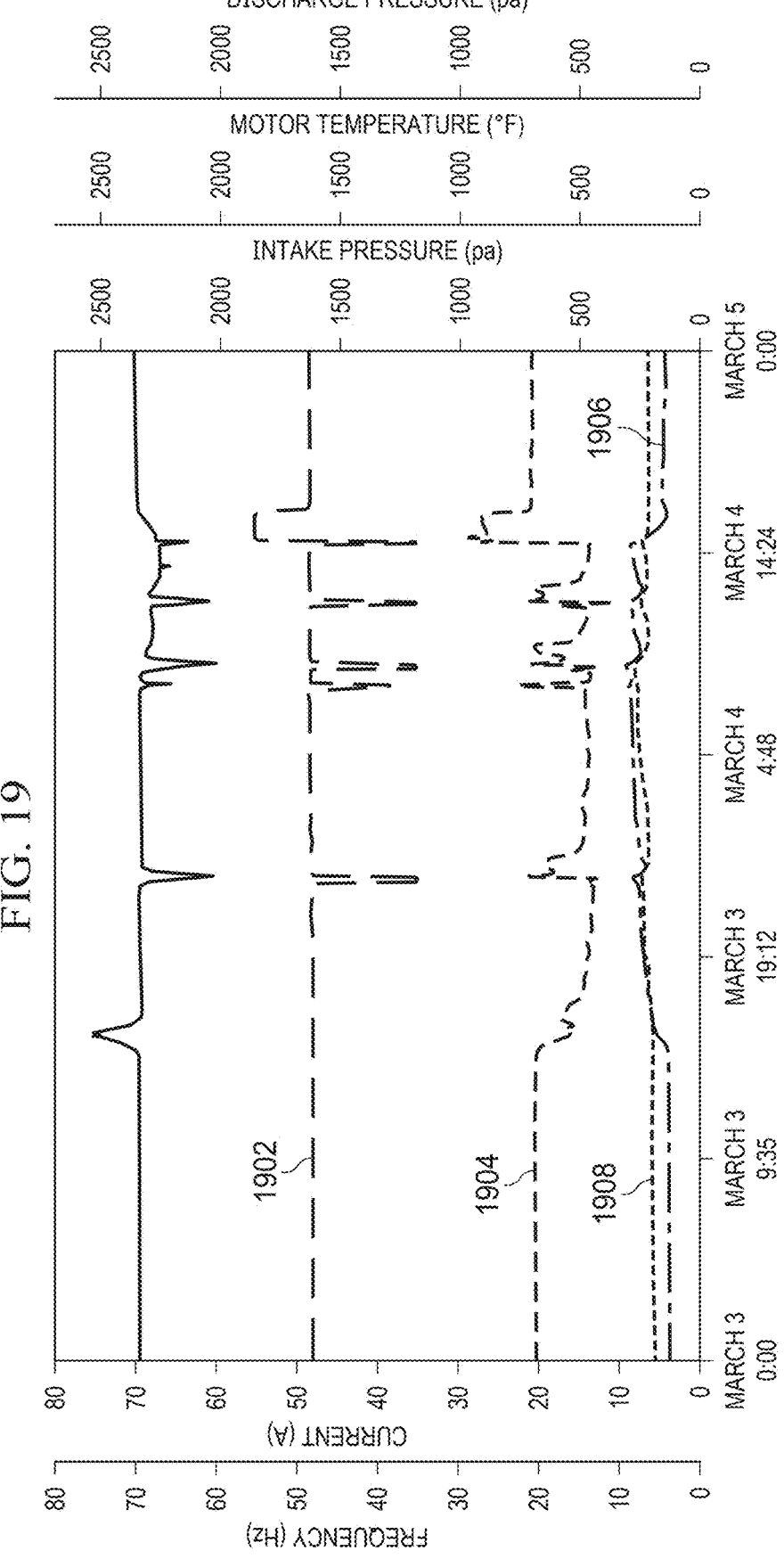
FIG. 19 is a graph of electrical submersible pump condition during an example breaking gas lock condition by increasing frequency.

Referring to now to FIG. 19, after several attempts at reducing the variable speed drive frequency, as indicated by curve 1902, to overcome the gas lock condition, the variable speed drive frequency was increased temporarily, as indicated by curve 1902, resulting in return to normal operating conditions. Current draw, indicated by curve 1904, was restored to 20A, intake pressure was lowered, as indicate by curve 1906, and motor temperature was lowered, as indicated by curve 1908.

Although particular embodiments have been described herein, it will be appreciated that the invention is not limited thereto and that many modifications and additions thereto may be made within the scope of the invention. For example, various combinations of the features of the following dependent claims can be made with the features of the independent claims without departing from the scope of the present invention.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The term "at least" followed by a number is used herein to denote the start of a range beginning with that number (which may be a ranger having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%.

When, in this document, a range is given as "(a first number) to (a second number)" or "(a first number)—(a second number)", this means a range whose lower limit is the first number and whose upper limit is the second number. For example, 25 to 100 should be interpreted to mean a range whose lower limit is 25 and whose upper limit is 100. Additionally, it should be noted that where a range is given, every possible subrange or interval within that range is also specifically intended unless the context indicates to the contrary. For example, if the specification indicates a range of 25 to 100 such range is also intended to include subranges such as 26-100, 27-100, etc., 25-99, 25-98, etc., as well as any other possible combination of lower and upper values within the stated range, e.g., 33-47, 60-97, 41-45, 28-96, etc. Note that integer range values have been used in this paragraph for purposes of illustration only and decimal and fractional values (e.g., 46.7-91.3) should also be understood to be intended as possible subrange endpoints unless specifically excluded.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

Further, it should be noted that terms of approximation (e.g., "about", "substantially", "approximately", etc.) are to be interpreted according to their ordinary and customary meanings as used in the associated art unless indicated otherwise herein. Absent a specific definition within this disclosure, and absent ordinary and customary usage in the associated art, such terms should be interpreted to be plus or minus 10% of the base value.

Thus, the present invention is well adapted to carry out the objects and attain the ends and advantages mentioned above as well as those inherent therein. While the inventive device has been described and illustrated herein by reference to certain preferred embodiments in relation to the drawings attached thereto, various changes and further modifications, apart from those shown or suggested herein, may be made therein by those of ordinary skill in the art, without departing from the spirit of the inventive concept the scope of which is to be determined by the following claims.

What is claimed is:

1. A method of operating an electrical submersible pump installation comprising:
monitoring a drive output current load of a drive of an electrical submersible pump;
determining when said drive output current load is below a current setpoint for establishing an undercurrent condition;
executing a fault routine that includes changing a drive frequency of said drive to a reaction speed parameter for a reaction time period; wherein
said current setpoint is below an operating current setpoint corresponding to a normal operating speed;

said reaction speed parameter is a reaction speed that is greater than said normal operating speed;
said electrical submersible pump comprises a pump having multiple stages;
said reaction speed increases head generated by each stage of said multiple stages of said pump that is not affected by gas;
said stages not affected by gas and being driven at said reaction speed generate a total amount of head in excess of a depth of said electrical submersible pump.

2. The method according to claim 1, further comprising:
after said step of determining, ignoring said undercurrent condition for a period of time equal to a trip delay time; then
initiating the fault routine.

3. The method according to claim 2, wherein:
said fault routine includes shutting down said drive; and
further comprising determining if a number of restart attempts is less than or equal to a number of permissible restart attempts; and, if so,
automatically executing a restart attempt.

4. The method according to claim 3, further comprising:
determining a reset delay reflecting an amount of time that there has been no subsequent fault condition after said restart attempt; and
resetting said number of permissible restart attempts.

5. The method according to claim 1, further comprising:
starting said drive; and
after said step of determining, ignoring said undercurrent condition for a period of time equal to a bypass time from the step of starting said drive.

6. A method of eliminating gas lock in an electrical submersible pump having a pump with multiple stages and a pump intake, the pump driven by a motor, said method comprising the steps of:
detecting a drop in amps of the motor for determining a gas lock condition of the pump wherein a stage of said pump nearest the pump intake are affected by a gas;
increasing a speed of said motor of the electrical submersible pump for increasing head generated by each of the multiple stages of said pump that are not affected by the gas;
wherein said step of increasing the speed of said motor is sufficient to generate a total amount of head in excess of a depth of said pump.

7. The method according to claim 6, further comprising:
calculating feet of head generated for each of said multiple stages of said pump at a given speed of said motor;
multiplying said feet of head per stage by a number of said stages in said pump to determine total head generated;
comparing said total head generated with said depth of said pump;
increasing said speed of said motor until said total head generated exceeds said depth of said pump.

* * * * *